United States Patent
Tischer et al.

(10) Patent No.: US 7,623,653 B2
(45) Date of Patent: *Nov. 24, 2009

(54) SYSTEMS AND METHODS FOR PASSING THROUGH ALTERNATIVE NETWORK DEVICE FEATURES TO PLAIN OLD TELEPHONE SYSTEM (POTS) DEVICES

(75) Inventors: Steven Tischer, Atlanta, GA (US); Kevin Kleinfelter, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 761 days.

This patent is subject to a terminal disclaimer.

(21) Appl. No.: 10/929,317

(22) Filed: Aug. 30, 2004

(65) Prior Publication Data

US 2005/0025308 A1 Feb. 3, 2005

Related U.S. Application Data

(63) Continuation-in-part of application No. 10/195,197, filed on Jul. 15, 2002, now Pat. No. 7,194,083.

(51) Int. Cl.
*H04M 1/00* (2006.01)
*H04M 9/00* (2006.01)

(52) U.S. Cl. ............................. 379/413.03; 379/399.01

(58) Field of Classification Search ............ 379/399.01, 379/413.03

See application file for complete search history.

(56) References Cited

U.S. PATENT DOCUMENTS

| 4,866,762 | A | | 9/1989 | Pintar | 379/200 |
|---|---|---|---|---|---|
| 5,905,950 | A | | 5/1999 | Anell | 455/421 |
| 6,075,783 | A | * | 6/2000 | Voit | 370/352 |
| 6,704,580 | B1 | * | 3/2004 | Fintel | 455/550.1 |
| 6,778,824 | B2 | * | 8/2004 | Wonak et al. | 455/426.2 |
| 7,032,115 | B2 | * | 4/2006 | Kashani | 713/300 |
| 7,073,129 | B1 | * | 7/2006 | Robarts et al. | 715/740 |
| 7,194,083 | B1 | * | 3/2007 | Tischer et al. | 379/399.01 |
| 7,283,519 | B2 | * | 10/2007 | Girard | 370/353 |
| 2004/0132438 | A1 | | 7/2004 | White | 455/418 |
| 2004/0240647 | A1 | | 12/2004 | Tiliks et al. | 379/114.14 |

OTHER PUBLICATIONS

U.S. Official Action dated Jul. 6, 2007 in U.S. Appl. No. 11/637,264.

* cited by examiner

*Primary Examiner*—Alexander Jamal
(74) *Attorney, Agent, or Firm*—Moazzam & Associates, LLC

(57) ABSTRACT

Systems and methods are provided for passing through features from alternative network devices, such as cellular telephones, to plain old telephone system (POTS) devices. In a broad sense, the system includes an interface that bridges the alternative network devices to the POTS devices. The interface is configured to convey feature data contained within signaling data generated by the alternative network devices and pass the feature data through to the connected POTS devices. If the feature data is incompatible with the connected POTS devices, the interface is further configured to determine a compatible protocol for the connected POTS devices and translate the feature data into the compatible protocol.

28 Claims, 16 Drawing Sheets

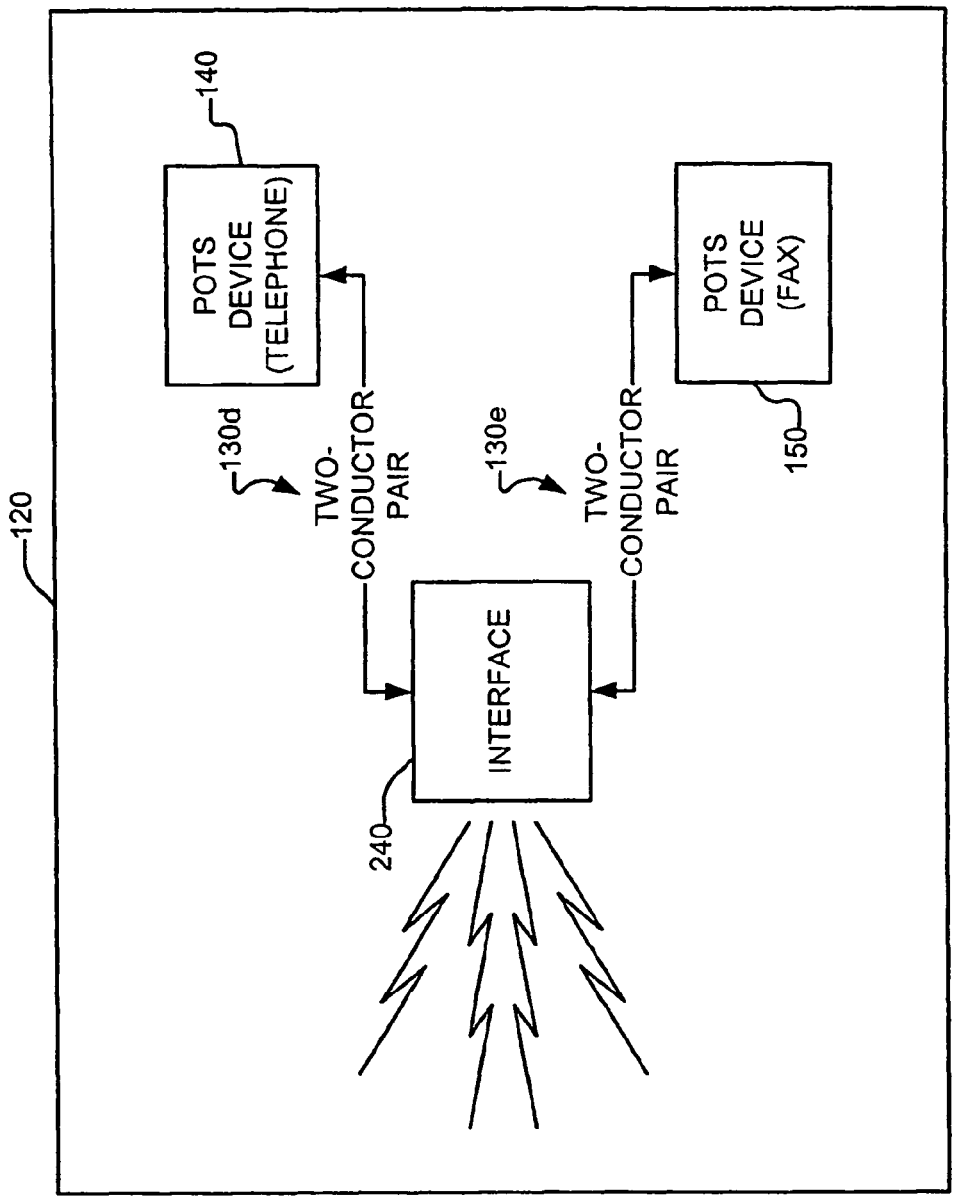
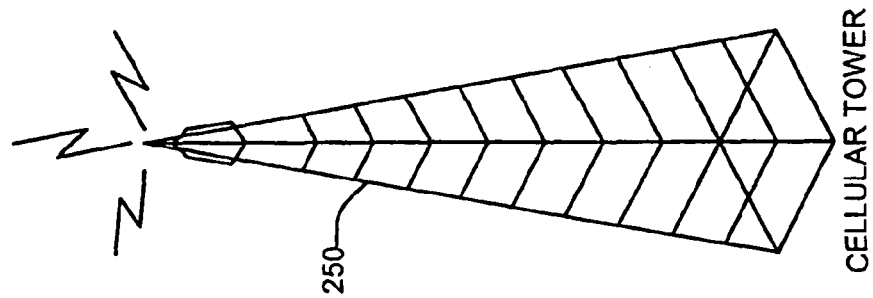
FIG. 2

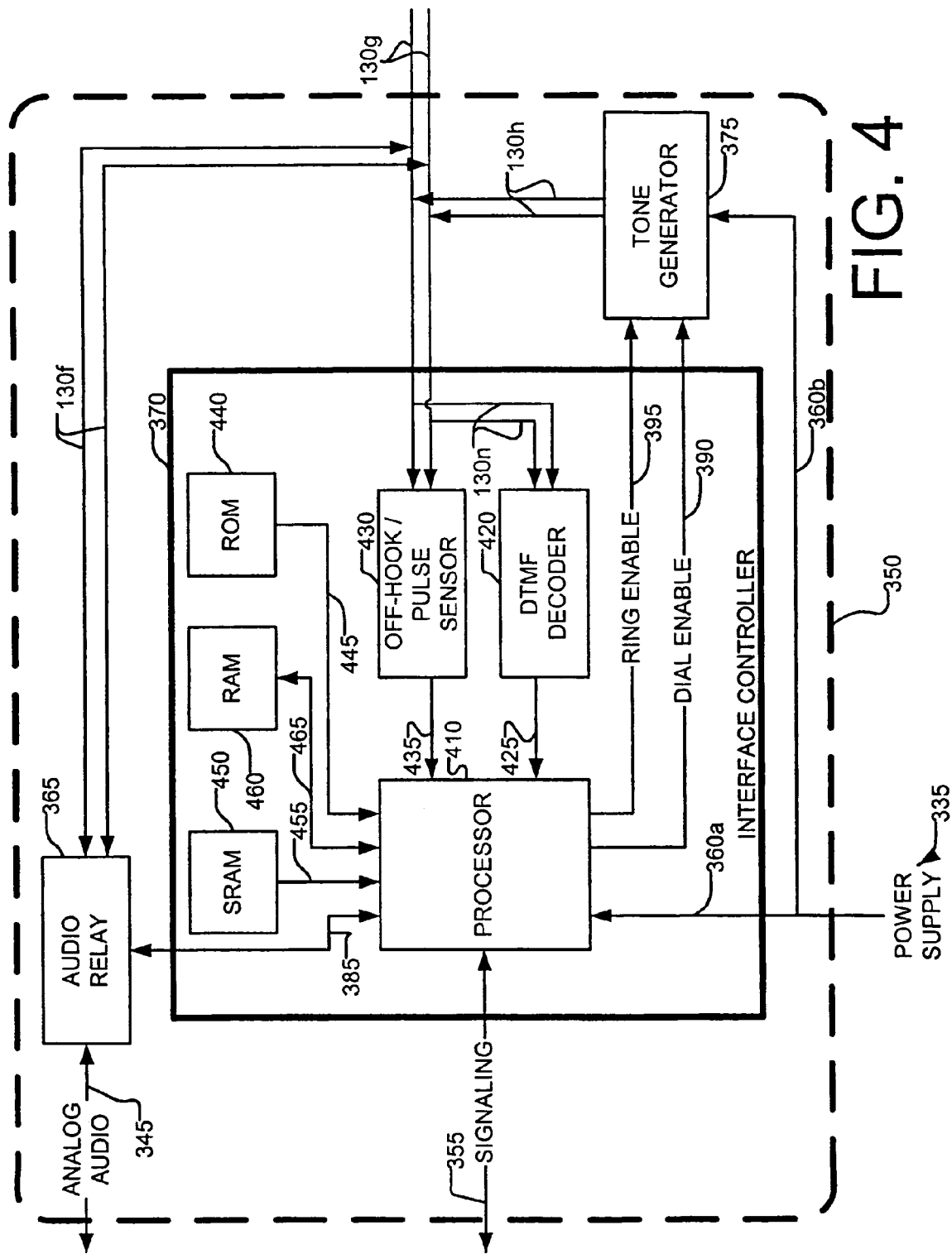

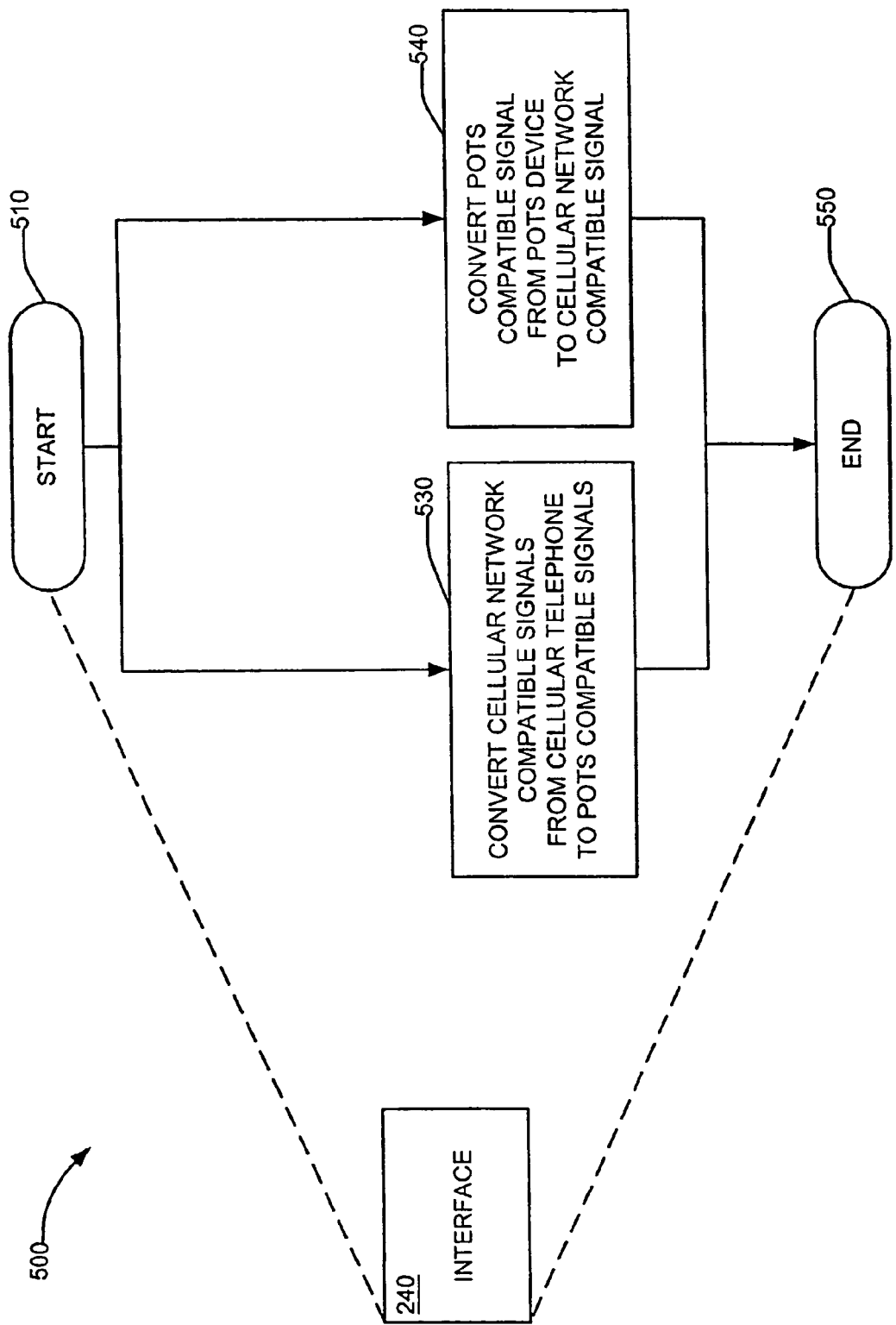

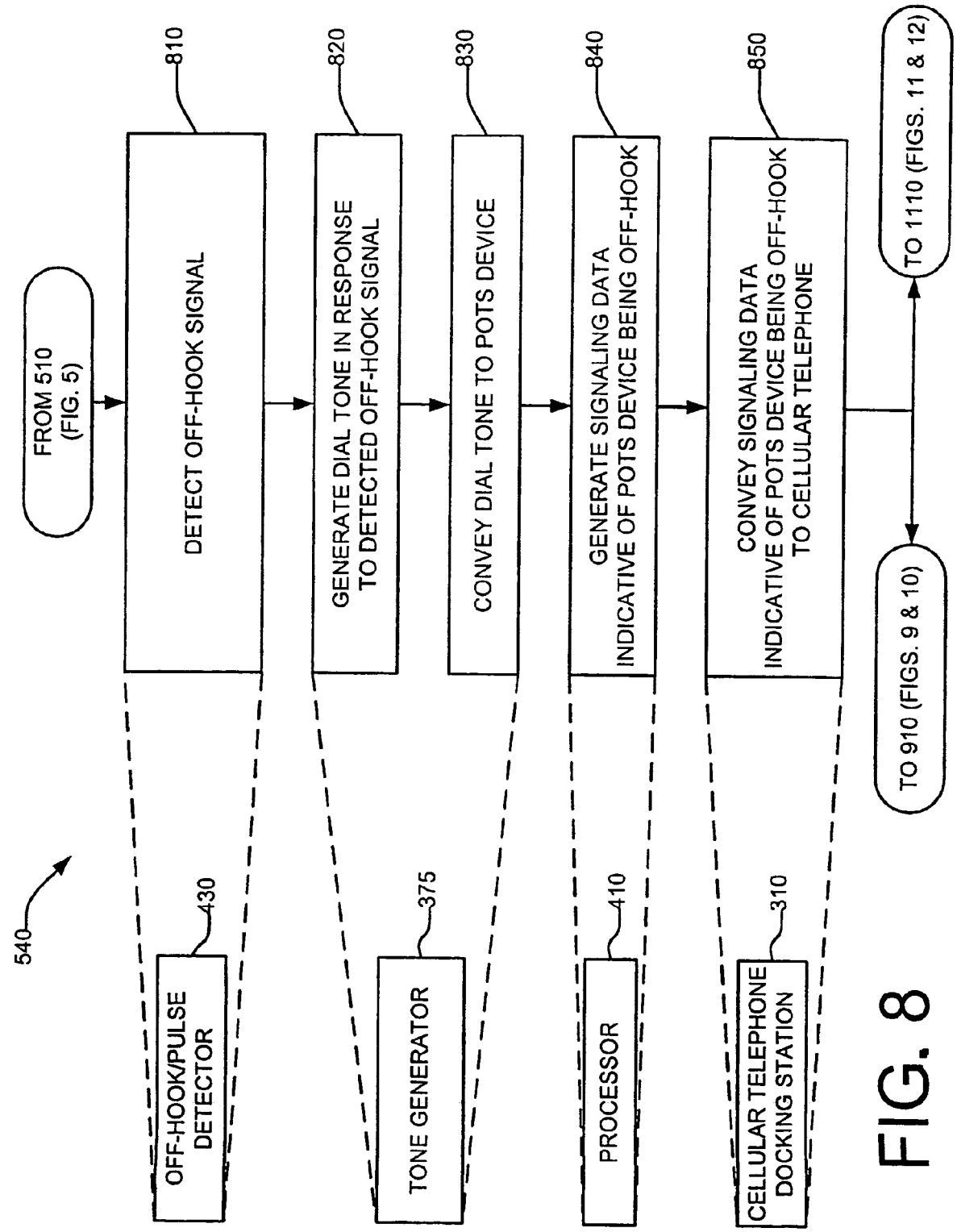

SYSTEMS AND METHODS FOR PASSING THROUGH ALTERNATIVE NETWORK DEVICE FEATURES TO PLAIN OLD TELEPHONE SYSTEM (POTS) DEVICES

CROSS REFERENCE TO RELATED APPLICATIONS

This patent application is a continuation-in-part of U.S. patent application Ser. No. 10/195,197, entitled "System and Method for Interfacing Plain Old Telephone System (POTS) Devices With Cellular Networks," filed on Jul. 15, 2002 now U.S. Pat. No. 7,194,083 and assigned to the same assignee as this application.

FIELD OF INVENTION

The present invention relates generally to telecommunications and, more particularly, to systems and methods for passing through alternative network device features to plain old telephone system (POTS) devices.

BACKGROUND

The telephone has greatly facilitated communications between parties, especially when great distances separate the parties. Metropolitan cities and suburbs typically have sufficient access to a public switched telecommunications/telephone network (PSTN) which is typically accessed by plain old telephone system (POTS) devices, as well as cellular networks which are accessible by cellular telephones. In many cases, cellular networks utilize digital signaling to provide enhanced features to users of cellular telephones. These enhanced features may include caller identification ("caller ID") for displaying name and/or number information, digital voice mail services for saving and retrieving messages, and customized ring tones which may be assigned to all incoming calls or a specified callers. Users of modern cellular telephones may add to a collection of customized ring tones by utilizing cellular networks to download them from an external network, such as the Internet.

However, in many instances, cellular telephone owners do not have access to the enhanced features provided by cellular networks on jointly owned POTS devices (even when some of these features are also offered by the PSTN) due to the fact that older or legacy POTS devices are incompatible with the signaling required to provide these features or due to the fact that cellular phone owners may not wish to pay an additional cost to have these features provided by the PSTN. Thus, many subscribers of both PSTN and cellular networks are forced to utilize their cellular telephones when access to enhanced features is desired, as there is currently no method for sharing these features with POTS devices.

SUMMARY

Systems and methods are provided for passing through feature data from alternative network devices to plain old telephone system (POTS) devices.

Briefly described, in architecture, one illustrative embodiment, among others, of the system comprises an interface configured to pass through feature data contained within signaling data from an alternative network device, such as a cellular telephone, to a connected POTS device. The feature data may include caller identification ("caller ID") information or ring tone information. The interface may be further configured to receive the feature data from the cellular telephone and determine if the connected POTS device is capable of receiving the feature data without translation. If the connected POTS device is capable of receiving the feature data without translation, the interface passes through the feature data to the POTS device. If the feature data needs to be translated, the interface may determine a signaling protocol capable of being received by the connected POTS device and passes through the feature data according to the determined protocol. The translation may include converting the feature data to a series of ring tones Another illustrative embodiment, among others, may be seen as a method for passing through alternative network device features to POTS devices. In this regard, one illustrative embodiment of the method may be seen as comprising the steps of receiving alternative network device signaling data containing feature data, parsing the signaling data for the feature data, determining if a connected POTS device is capable of receiving the feature data contained within the signaling data, and if the POTS device is capable of receiving the feature data contained within the signaling data, then passing the feature data through to the POTS device. The method may further comprise the step of, if the feature data is not capable of receiving the feature data contained within the POTS device, translating the feature data into a protocol compatible with the POTS device and then passing the feature data through to the POTS device.

Other systems, methods, features, and advantages will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is a block diagram showing one illustrative embodiment of the system for interfacing POTS devices with cellular networks.

FIG. 4 is a block diagram showing one illustrative embodiment of the hardware within the interface of FIG. 3.

FIG. 5 is a flowchart showing one illustrative embodiment of the method for interfacing POTS devices with cellular networks.

FIG. 8 is a flowchart showing several steps associated with the conversion of POTS compatible signals to cellular network compatible signals.

DETAILED DESCRIPTION OF THE ILLUSTRATIVE EMBODIMENTS

Reference will now be made in detail to the description. While several illustrative embodiments of the invention will be described in connection with these drawings, there is no intent to limit it to the illustrative embodiment or illustrative embodiments disclosed therein. On the contrary, the intent is to cover all alternatives, modifications, and equivalents included within the spirit and scope of the invention as defined by the claims.

Figure 1:
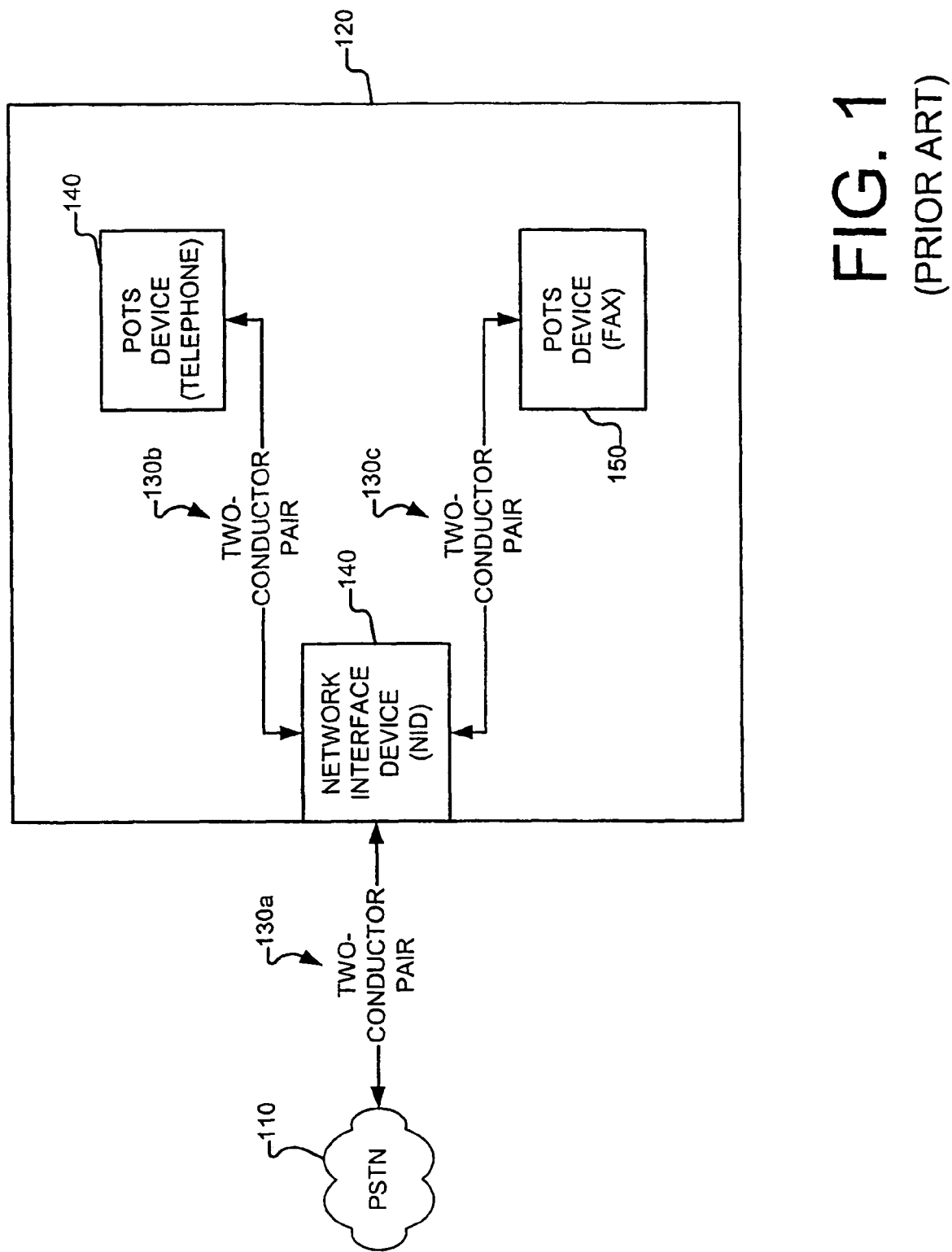
FIG. 1 is a block diagram showing a conventional plain old telephone system (POTS) connection to a telephone company through a network interface device.

FIG. 1 is a block diagram showing a conventional plain old telephone system (POTS) connection to a public switched telephone network (PSTN) 110 through a network interface device (NID) 140. Since such connections are well known, only a cursory discussion is presented here. As shown in FIG. 1, several POTS devices 140, 150 occupy a location 120 (e.g., home, business, etc.). Each POTS device 140, 150 is connected to the NID 140 by two-conductor pair wires 130b, 130c, also known as POTS pairs, or twisted pairs. The NID 140 serves as the interface between the POTS devices 140, 150 and the PSTN 110, wherein the ND 140 is connected to the PSTN 110 through at least a two-conductor pair 130a or landline 130a. As evident from FIG. 1, if the landline 130a is severed, or if the landline 130a is unavailable due to geographical limitations, then the POTS devices 140, 150 within the location 120 have no connection to the PSTN 110.

FIG. 2 is a block diagram showing one illustrative embodiment of a system for interfacing POTS devices 140, 150 with cellular networks. As shown in FIG. 2, one or more POTS devices 140, 150 occupy a location 120. However, unlike FIG. 1, the POTS devices 140, 150 in FIG. 2 are configured to communicate with at least one cellular tower 250 through an interface 240, thereby permitting connection between the POTS devices 140, 150 and a cellular network. In this sense, the POTS devices 140, 150 are connected to the interface 240, rather than an NED 140 (FIG. 1), by two-conductor pair wires 130d, 130e. Since the interface 240 is a bridge between the POTS devices 140, 150 and the cellular network, the interface 240 is configured to receive POTS compatible signals from the POTS devices 140, 150 and convert the POTS compatible signals to cellular network compatible signals, which are transmitted from the interface 240 to the cellular tower 250. Additionally, the interface 240 is configured to receive cellular network compatible signals from the cellular tower 250 and convert the cellular network compatible signals to POTS compatible signals, which are then forwarded to the POTS devices 140, 150 for use within the location 120. While a specific PSTN network is now shown in FIG. 2, it will be clear to one of ordinary skill in the art that the cellular tower 250 may be connected to a PSTN network, thereby permitting communication with other PSTN devices.

Figure 3:
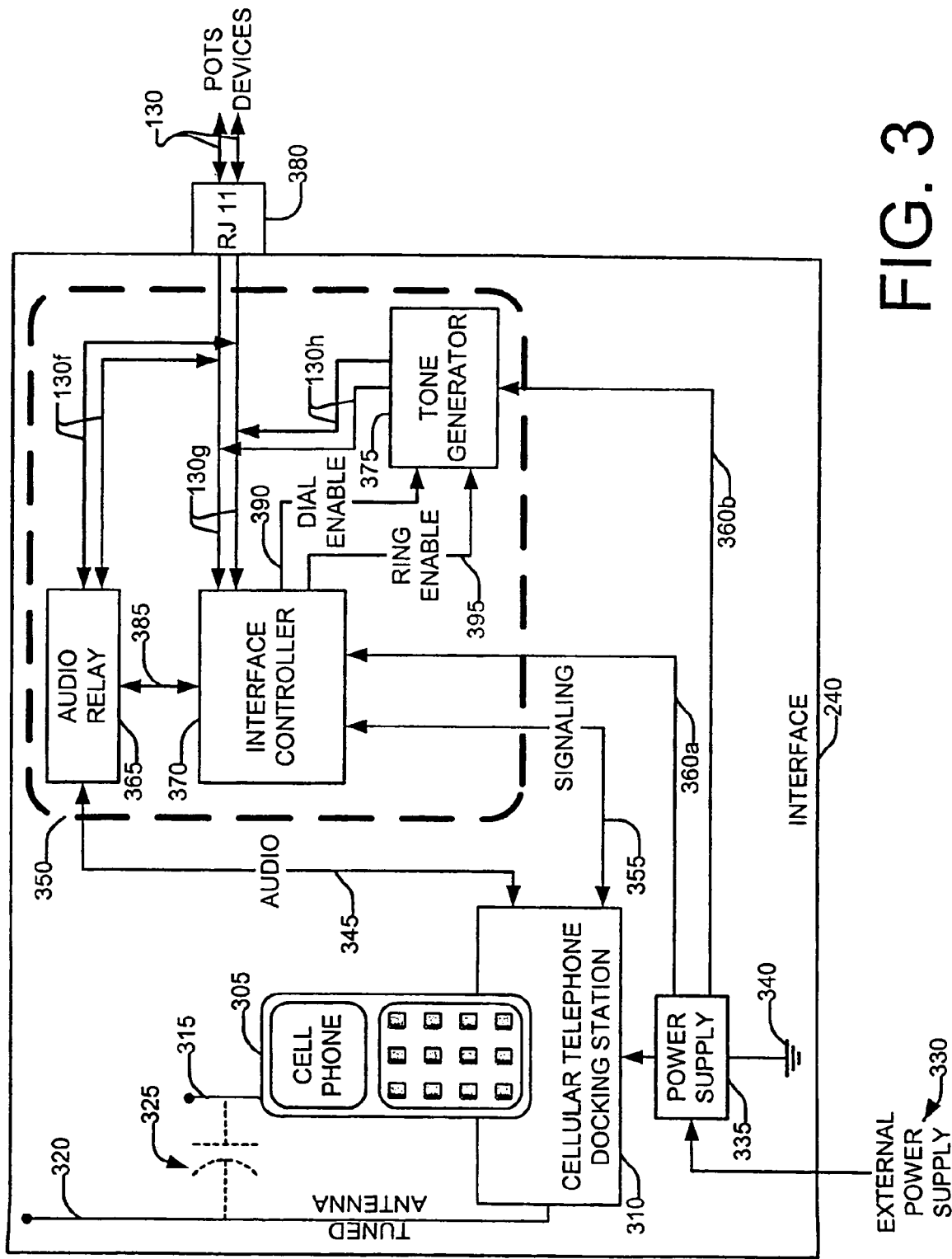
FIG. 3 is a block diagram showing one illustrative embodiment of the interface of FIG. 2.

FIG. 3 is a block diagram showing, in greater detail, a preferred illustrative embodiment of the interface 240 of FIG. 2. In the preferred illustrative embodiment, the cellular network compatible signals are transmitted and received at the interface 240 by a cellular telephone 305 while the POTS compatible signals are transmitted and received at the interface 240 through a POTS connector 380, such as an RJ11 connector 380. Thus, in the preferred illustrative embodiment, the interface 240 comprises a cellular phone docking station 310 that is configured to interface with the cellular telephone 305, thereby establishing a communications link with the cellular telephone 305. The cellular phone docking station 310 may also have a tuned antenna 320 that is configured to improve transmission and reception by the cellular telephone 305, thereby providing a more robust connection to the cellular network through the cellular tower 250 (FIG. 2). The tuned antenna 320 may be coupled to a cellular telephone antenna 315 in a non-destructive, non-contact, or capacitative manner, for example, using capacitative coupling 325, as shown in FIG. 3. In addition to interfacing with a cellular telephone 305 through one of a variety of conventional connectors (not shown), the cellular phone docking station 310 is configured to receive signaling data through signaling line 355, which may include commands associated with outgoing telephone calls. Thus, in one illustrative embodiment, the signaling data on signaling line 355 may be indicative of a telephone number. The received signaling data on signaling line 355 is conveyed to the cellular telephone 305 by the cellular phone docking station 310, thereby permitting control over certain operations of the cellular telephone 305 using the signaling data on signaling line 355. In conveying the signaling data on signaling line 355, the cellular phone docking station 305 may modify the signaling data on signaling line 355 appropriately (e.g., amplify, attenuate, reformat, etc.), or, alternatively, the cellular phone docking station 305 may relay the signaling data on signaling line 355 without modification. Regardless of whether or not the signaling data on signaling line 355 is modified, several aspects of the conveyed signal are discussed below, in greater detail, with reference to other components 350 associated with the interface 240.

In addition to the cellular phone docking station 310, the interface 240 comprises an interface controller 370, an audio relay 365, a tone generator 375, and a power supply 335. The audio relay 365 is configured to exchange analog-audio signals 345 between the POTS devices 140, 150 (FIG. 2) and the cellular phone docking station 310. In this sense, for incoming analog-audio signals 345 (i.e., audio from the cellular telephone 305 to the POTS devices 140, 150 (FIG. 2)), the audio relay 365 receives analog-audio signals 345 from the cellular phone docking station 310 and transmits the analog-audio signals 345 to the POTS devices 140, 150 (FIG. 2) through the POTS connector (e.g., RJ11 connector) 380. Similarly, for outgoing analog-audio signals 345 (i.e., audio from the POTS devices 140, 150 (FIG. 2) to the cellular telephone 305), the analog audio signals 345 are received by the audio relay 365 through the POTS connector 380 and transmitted to the cellular phone docking station 310. Thus, the audio relay 365 provides a bi-directional communication link for the analog-audio signals 345 between the POTS devices 140, 150 (FIG. 2) and the cellular phone docking station 310. In a preferred illustrative embodiment, the audio relay 365 is also configured to either amplify or attenuate the analog-audio signals 345 in response to audio-control signals 385 generated by the interface controller 370. Thus, the behavior of the audio relay 365 is governed by the interface controller 370, which is discussed in greater detail below.

The tone generator 375 is configured to generate certain tones that are used by the POTS devices 140, 150 (FIG. 2). For example, when there is an incoming telephone call, the POTS devices 140, 150 (FIG. 2) "ring" to indicate the presence of the incoming telephone call. The tone generator 375, in such instances, is configured to generate a ring tone, which is then transmitted to the POTS devices 140, 150 (FIG. 2) through the POTS connector 380. The transmitted ring tone indicates to the POTS devices 140, 150 (FIG. 2) that they should "ring," thereby notifying the user of the incoming telephone call. The ring tone is generated in response to a ring enable signal on ring enable line 395, which is discussed below with reference to the interface controller 370.

In another example, when a user picks up a POTS telephone 140 (FIG. 2), a dial-tone is produced at the POTS telephone 140 (FIG. 2). The tone generator 375 is configured to generate the dial tone and transmit the generated dial tone to the POTS telephone 140 (FIG. 2). The dial tone is generated in response to a dial enable signal on dial enable line 390, which is also discussed below with reference to the interface controller 370.

The power supply 335 is configured to provide the components of the interface 240 with the requisite power. In this sense, the power supply 335 is connected to an external power supply 330 from which it receives external power. The external power is converted by the power supply 335 to a DC voltage, which is used to power the cellular phone docking station 310, the tone generator 375, the interface controller 370, and any other device in the interface 240 that may be powered by a DC source.

The interface controller 370 is configured to control the behavior of the audio relay 365, the tone generator 375, and the cellular phone docking station 310 during the conversion of POTS compatible signals to cellular network compatible signals, and vice versa. Thus, when an outgoing telephone call is placed by one of the POTS devices 140, 150 (FIG. 2), the interface controller 370 receives the dialed numbers and converts the dialed numbers to a digital command. The digital command is transmitted as signaling data on signaling line 355 from the interface controller 370 to the cellular phone docking station 310, which, in turn, transmits the signaling data on signaling line 355 to the cellular telephone 305. The signaling data, therefore, 355 instructs the cellular telephone 305 to dial the number. In one illustrative embodiment, when the number has been dialed and the called party picks up the phone, the cellular telephone 305 detects the connection and conveys an analog-audio signal 345 to the audio relay 365. In this illustrative embodiment, the audio relay 365 subsequently indicates to the interface controller 370 that the call is connected, and the interface controller 370 generates an audio-control signal 385, thereby enabling bi-directional audio communication of analog-audio signals 345 (i.e., talking between the connected parties) through the audio relay 365. If the party on the POTS telephone 140 (FIG. 2) disconnects (i.e., hangs up the phone), then the disconnect is detected by the interface controller 370 through the POTS connector 380. In this illustrative embodiment, the interface controller 370 generates another audio-control signal 385 in response to the disconnect, thereby disabling the audio relay 365 and terminating the bi-directional audio communication between the POTS telephone 140 (FIG. 2) and the cellular telephone 305. The interface controller 370 further generates, in response to the disconnect, signaling data on signaling line 355, which instructs the cellular telephone 305 to stop transmission and reception. If, on the other hand, the cellular telephone 305 disconnects, then this is detected by the audio relay 365 in one illustrative embodiment. The audio relay 365, in turn, transmits the disconnect information to the interface controller 370, and the interface controller 370 subsequently generates the audio-control signal 385 to disable the audio relay 365.

In another illustrative embodiment, information relating to the connected call is transmitted to the interface controller 370 as signaling data on signaling line 355, rather than as an analog-audio signal 345. In this illustrative embodiment, the cellular telephone 305 generates signaling data on signaling line 355 when the connection is established. The signaling data on signaling line 355 is received by the interface controller 370, which generates an audio-control signal 385 in response to the received signaling data on signaling line 355. The audio-control signal 385 enables the audio relay 365, thereby permitting bi-directional audio communication between the POTS telephone 140 (FIG. 2) and the cellular telephone 305. If the party on the POTS telephone 140 (FIG. 2) disconnects (i.e., hangs up the phone), then the disconnect is detected by the interface controller 370 through the POTS connector 380. The interface controller 370 subsequently generates an audio-control signal 385 to disable the audio relay 365, thereby terminating the bi-directional audio communication between the POTS telephone 140 (FIG. 2) and the cellular telephone 305. If, however, the cellular telephone 305 disconnects, then the cellular telephone 305, in this illustrative embodiment, generates signaling data on signaling line 355 indicative of the disconnected call. The generated signaling data on signaling line 355 is transmitted to the interface controller 370, which subsequently generates an audio-control signal 385 to disable the audio relay 365.

In the case of an incoming telephone call, the cellular telephone 305 detects the incoming telephone call and conveys this information to the interface controller 370. In one illustrative embodiment, the information is conveyed to the interface controller 370 through the audio relay 365. Thus, in this illustrative embodiment, the incoming telephone call generates an analog-audio signal 345 at the cellular telephone 305. The analog-audio signal 345 is transmitted from the cellular telephone 305 to the audio relay 365 through the cellular phone docking station 310, and the audio relay 365 then indicates to the interface controller 370 that there is an incoming call. The interface controller 370 receives this information and generates a ring enable signal on ring enable line 395. The ring enable signal on ring enable line 395 is received by the tone generator 375, which generates the ring tone in response to the ring enable signal on ring enable line 395. The ring tone makes the POTS devices 140, 150 (FIG. 2) "ring." When one of the POTS device 140, 150 (FIG. 2) is picked up and a connection is established, the interface controller 370 detects the established call and generates signaling data on signaling line 355, which indicates to the cellular telephone 305 that the connection is established. Additionally, the interface controller 370 generates an audio-control signal 385, which enables the audio relay 365 for bidirectional audio communication between the POTS device 140, 150 (FIG. 2) and the cellular telephone 305. When the call ends, the system disconnects as described above.

In another illustrative embodiment, the information is conveyed to the interface controller 370 through signaling data on signaling line 355. Thus, in this illustrative embodiment, when the cellular telephone 305 detects an incoming telephone call, it generates signaling data on signaling line 355. The signaling data on signaling line 355 is transmitted to the interface controller 370, thereby indicating that there is an incoming call. The interface controller 370 receives this information and generates a ring enable signal on ring enable line 395. The ring enable signal on ring enable line 395 is received by the tone generator 375, which generates the ring tone in response to the ring enable signal on ring enable line 395. The tone makes the POTS devices 140, 150 (FIG. 2) "ring." When one of the POTS devices 140, 150 (FIG. 2) is picked up and a connection is established, the interface controller 370 detects the established call and generates signaling data on signaling line 355, which indicates to the cellular telephone 305 that the connection is established. Additionally, the interface controller 370 generates an audio-control signal 385, which enables the audio relay 365 for bi-directional audio communication between the POTS device 140, 150 (FIG. 2) and the cellular telephone 305. When the call ends, the system disconnects as described above.

FIG. 4 is a block diagram showing the interface controller 370 of FIG. 3 in greater detail. The interface controller 370 is shown in FIG. 4 as comprising a processor 410, random-access memory (RAM) 460, read-only memory (ROM) 440, static-random-access memory (SRAM) 450, an off-hook/pulse sensor 430, and a dual-tone multi-frequency (DTMF) decoder 420. The ROM 440 is configured to store the instructions that run the interface controller 370. In this sense, the ROM 440 is configured to store the program that controls the behavior of the interface controller 370, thereby allowing the interface controller 370 to convert POTS compatible signals to cellular network compatible signals, and vice versa. The SRAM 450 is adapted to store configuration information, such as whether the system is amenable to 10-digit dialing or 7-digit dialing, international calling protocols, etc. Thus, the SRAM 450 may be adapted differently for systems that are used in different geographical areas, or systems that use different calling protocols. The RAM 460 is configured to store temporary data during the running of the program by the processor 410. The processor is configured to control the operation of the off-hook/pulse sensor 430, the DTMF decoder 420, the tone generator 375, and the audio relay 365 in accordance with the instructions stored in ROM 440. Additionally, the processor 410 is configured to generate signaling data on signaling line 355, which may instruct the cellular telephone 305 (FIG. 3) to dial a number, disconnect a call, etc. Several of these functions are discussed in detail below with reference to the off-hook/pulse sensor 430 and the DTMF decoder 420.

The off-hook/pulse sensor 430 is configured to detect when any of the POTS devices 140, 150 (FIG. 2) are off-hook and generate an off-hook signal 435 when a POTS device 140, 150 (FIG. 2) is detected as being off-hook. In this sense, the off-hook/pulse sensor 430 is connected to the POTS connector 380 (FIG. 3) through the two-conductor pair wires 130g. Thus, when any of the POTS devices 140, 150 (FIG. 2) connected to the two-conductor pair 130 go off-hook, the off-hook is detected by the off-hook/pulse sensor 430, which is also connected to the two-conductor pair 130. The off-hook/pulse sensor 430 generates an off-hook signal 435 after detecting that a POTS device 140, 150 (FIG. 2) is off-hook, and subsequently transmits the off-hook signal 435 to the processor 410. If the POTS device 140, 150 (FIG. 2) is receiving an incoming call, then the off-hook signal 435 indicates that the POTS device 140, 150 (FIG. 2) has "picked up" the incoming call, thereby alerting the processor 410 that the processor 410 should establish a bi-directional audio connection between the cellular telephone 305 (FIG. 3) and the POTS device 140, 150 (FIG. 2). If, on the other hand, the POTS device 140, 150 (FIG. 2) is placing an outgoing call, then the off-hook signal 435 alerts the processor 410 that a phone number will soon follow. In either event, the off-hook/pulse sensor 430 transmits the off-hook signal 435 to the processor 410, which, in turn, generates signaling data on signaling line 355 indicative of the POTS device 140, 150 (FIG. 2) being off-hook. The signaling data on signaling line 355 is then conveyed, either with or without modification, to the cellular telephone 305 through the cellular phone docking station 310.

The off-hook/pulse sensor 430 is further configured to detect dialing from POTS devices 140, 150 (FIG. 2) that are configured for pulse dialing. Since pulse dialing emulates rapid sequential off-hook signals, the off-hook/pulse sensor 430 receives pulses (i.e., the rapid sequential off-hook signals) and produces a sequence of off-hook signals 435 or pulse-dialing signals. The sequence of off-hook signals 435 is relayed to the processor 410, which converts the sequence of off-hook signals into signaling data on signaling line 355 that is indicative of the dialed number. The signaling data on signaling line 355 is transmitted from the processor 410 to the cellular telephone 305 through the cellular phone docking station 310. The cellular telephone 305, after receiving the signaling data on signaling line 355, dials the number indicated by the signaling data on signaling line 355, thereby permitting phone calls by the POTS devices 140, 150 (FIG. 2) through the cellular network. In one illustrative embodiment, the numbers dialed by the POTS devices 140, 150 (FIG. 2) are stored in RAM 460, and, once a predetermined number of dialed numbers has been stored, the processor 410 conveys the stored numbers and a "send" command to the cellular telephone. In other words, upon receiving enough digits to dial a telephone number, as indicated by the configuration information in SRAM 450, the processor 410 commands the cellular telephone 305 to dial the outgoing number, thereby connecting a call from the POTS device 140, 150 (FIG. 2) through the cellular network. In another illustrative embodiment, the RAM stores numbers as they are dialed by the POTS devices 140, 150 (FIG. 2). If, during dialing, the processor 410 detects a delay or a pause, then the processor 410 presumes that all of the digits of the telephone number have been dialed. Thus, the processor 410 commands the cellular telephone 305 to dial the outgoing number, thereby connecting the call from the POTS device 140, 150 (FIG. 2) through the cellular network.

The DTMF decoder 420 is configured to detect dialing from POTS devices 140, 150 (FIG. 2) that are configured for DTMF or "tone" dialing. The DTMF decoder 420 receives a tone, which represent a number, through the two-conductor pair 130n. After receiving the tone, the DTMF decoder 420 generates a DTMF-dialing signal 425 that is indicative of the number that was dialed. The DTMF-dialing signal 425 is then transmitted to the processor 410, which converts the DTMF-dialing signal 425 into signaling data on signaling line 355 that is indicative of the number that was dialed. The signaling data on signaling line 355 is transmitted from the processor 410 to the cellular telephone 305 through the cellular phone docking station 310. The cellular telephone 305 subsequently dials the number indicated by the signaling data on signaling line 355, thereby allowing the POTS device 140, 150 (FIG. 2) to make a call using the cellular network.

It can be seen, from FIGS. 2 through 4, that the various illustrative embodiments of the system will permit the interfacing of POTS devices 140, 150 (FIG. 2) with a cellular network. Specifically, in one illustrative embodiment, POTS devices 140, 150 (FIG. 2) are interfaced with the cellular network through a cellular telephone 305 (FIG. 3), which is attached to the interface 240 at a cellular phone docking station 310. In addition to the various systems, as described above, another illustrative embodiment of the invention may be seen as a method for interfacing POTS devices 140, 150 (FIG. 2) with cellular networks. Several illustrative embodiments of the method are described with reference to FIGS. 5 through 12 below.

FIG. 5 is a flowchart showing one illustrative embodiment of the method for interfacing POTS devices with cellular networks. In a broad sense, once a POTS device 140, 150 (FIG. 2) has been coupled to a cellular telephone 305 (FIG. 3) through an interface 240 (FIG. 2), this illustrative embodiment may be seen as converting, in step 530, cellular network compatible signals from the cellular telephone 305 (FIG. 3) to POTS compatible signals, and converting, in step 540, POTS compatible signals from the POTS devices 140, 150 (FIG. 2) to cellular network compatible signals. In a preferred illustrative embodiment, the converting steps 530, 540 are performed at the interface 240.

Figure 6A:
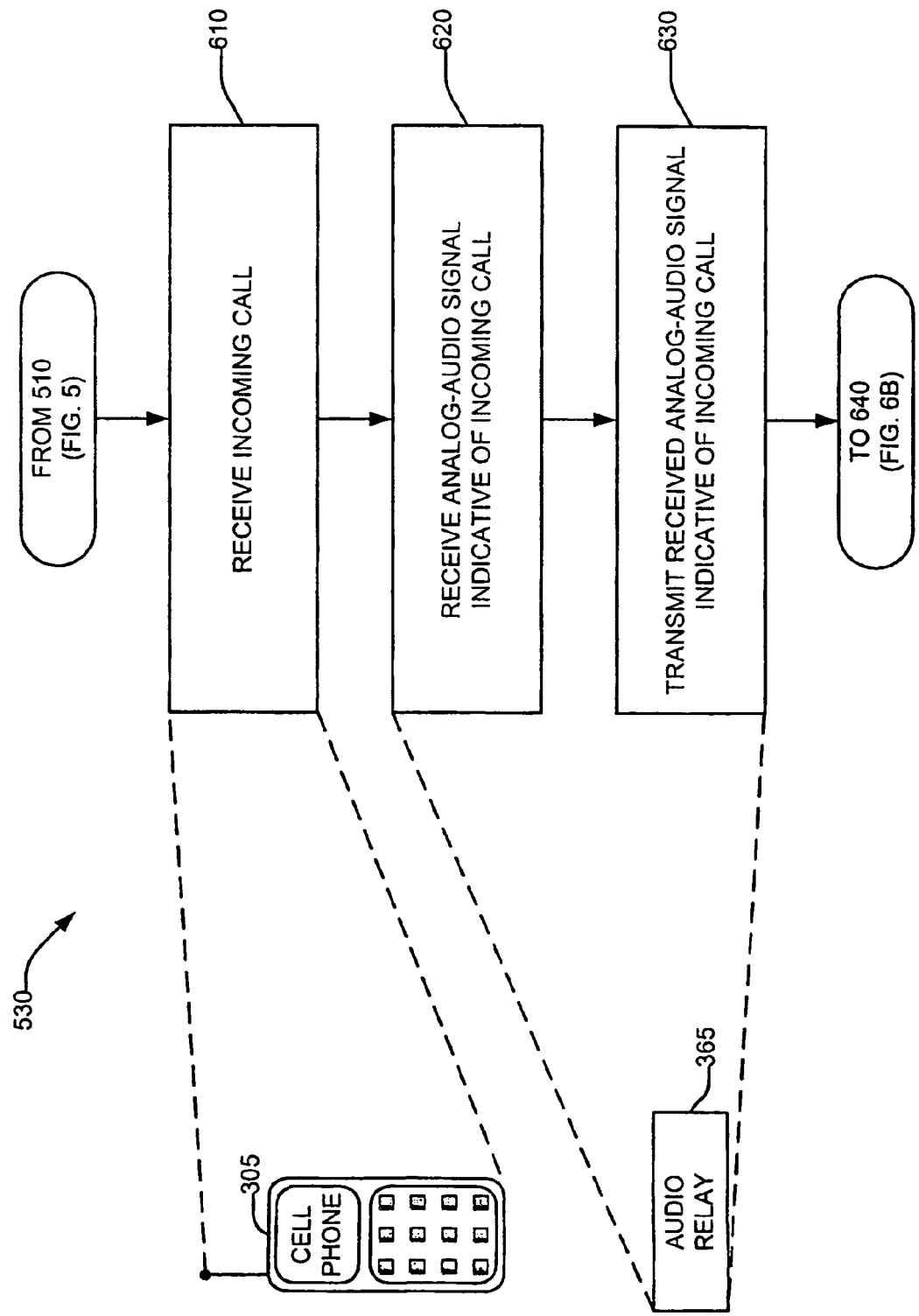
FIGS. 6A and 6B are flowcharts showing one illustrative embodiment of the method associated with the conversion of cellular network compatible signals to POTS compatible signals.
Figure 6B:
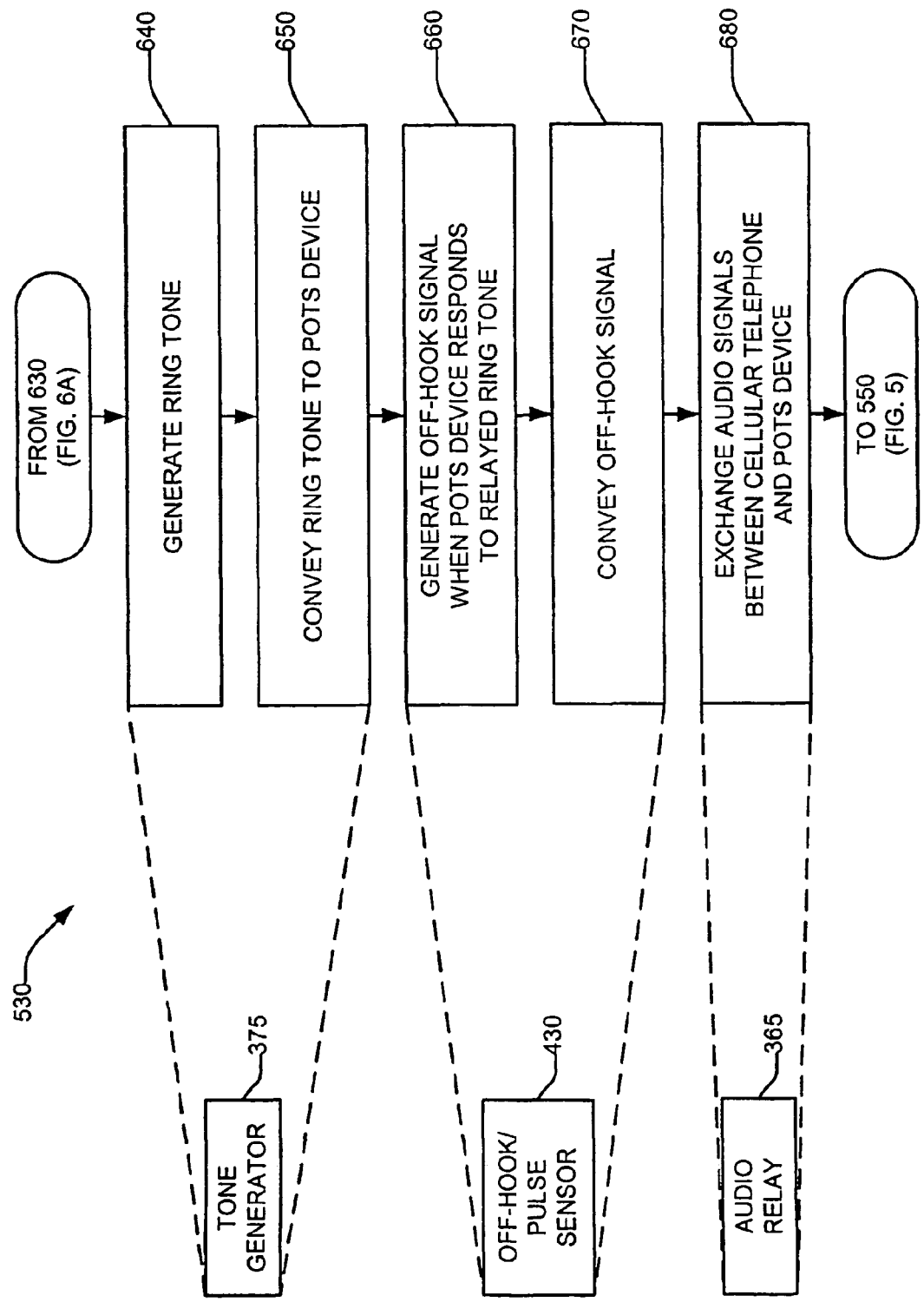

FIGS. 6A and 6B are flowcharts showing one illustrative embodiment of the method associated with the conversion 530 of cellular network compatible signals to POTS compatible signals. As an initial matter, the cellular network compatible signals are received through the cellular telephone 305 (FIG. 3). Thus, in step 610, the system receives an incoming call through the cellular telephone 305 (FIG. 3). Once the incoming call is received 610, the system further receives, in step 620, an analog-audio signal 345 (FIG. 3) indicative of the incoming call from the cellular telephone 305 (FIG. 3). The received analog-audio signal 345 (FIG. 3) is then transmitted, in step 630, to an interface controller 370 (FIG. 3). The interface controller 370 (FIG. 3) generates, in step 640, a ring tone in response to receiving the analog-audio signal 345 (FIG. 3). In a preferred illustrative embodiment, the ring tone is generated 640 by a tone generator 375 (FIG. 3). The generated 640 ring tone is conveyed, in step 650, to the POTS devices 140, 150 (FIG. 2), and, when the POTS device 140, 150 (FIG. 2) is "picked up," an off-hook signal is generated, in step 660, and conveyed, in step 670, to the interface controller 370 (FIG. 3). This triggers the interface controller 370 (FIG. 3) to activate the audio relay 365 (FIG. 3), and analog-audio signals 345 (FIG. 3) are exchanged, in step 680, between the POTS devices 140, 150 (FIG. 2) and the cellular telephone 305 (FIG. 3) through the audio relay 365 (FIG. 3). Thus, in this illustrative embodiment, once the incoming call is connected between the cellular telephone 305 (FIG. 3) and the POTS device 140, 150 (FIG. 2), the POTS device 140, 150 (FIG. 2) freely communicates through the cellular network.

Figure 7A:
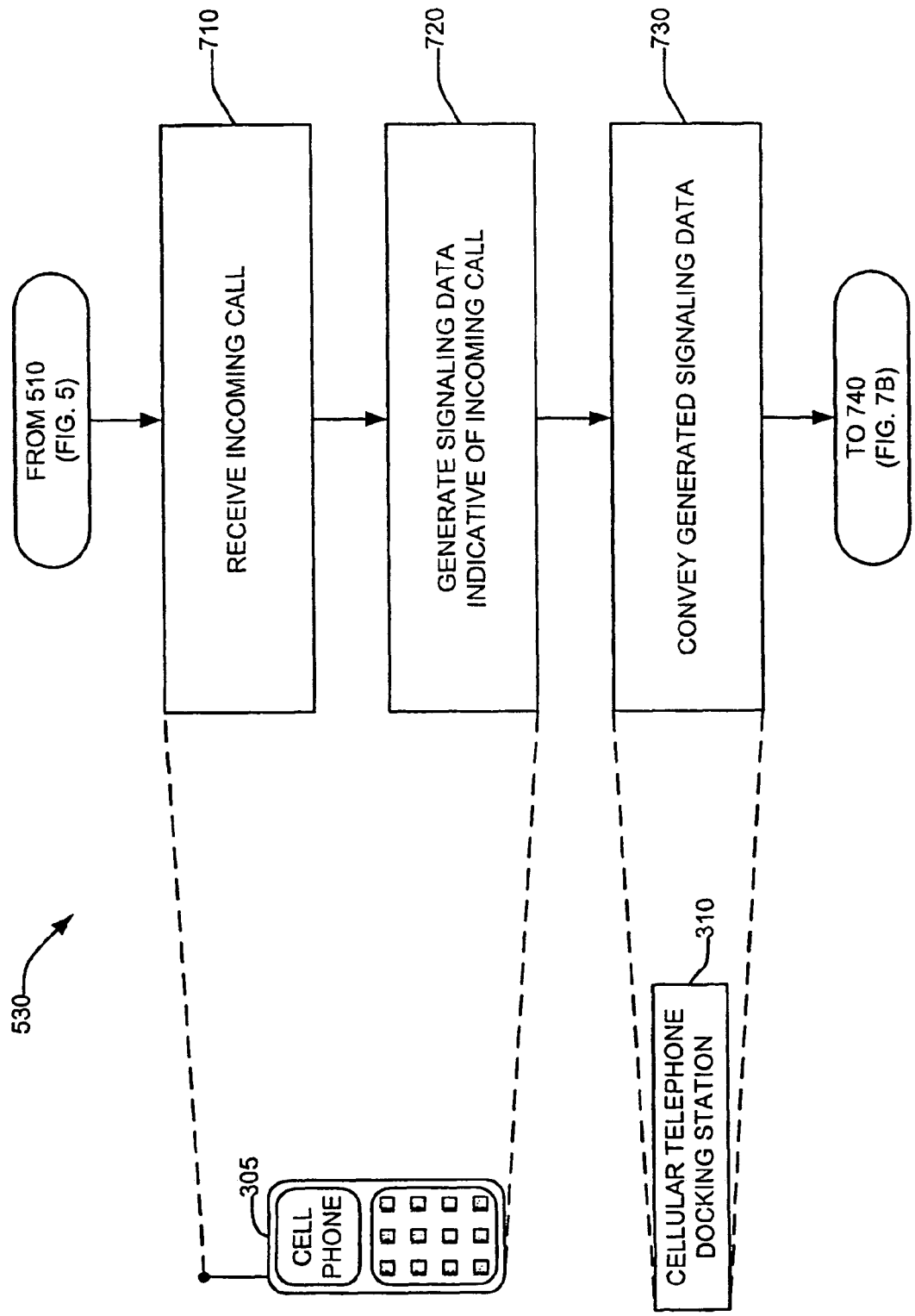
FIGS. 7A and 7B are flowcharts showing another illustrative embodiment of the method associated with the conversion of cellular network compatible signals to POTS compatible signals.
Figure 7B:
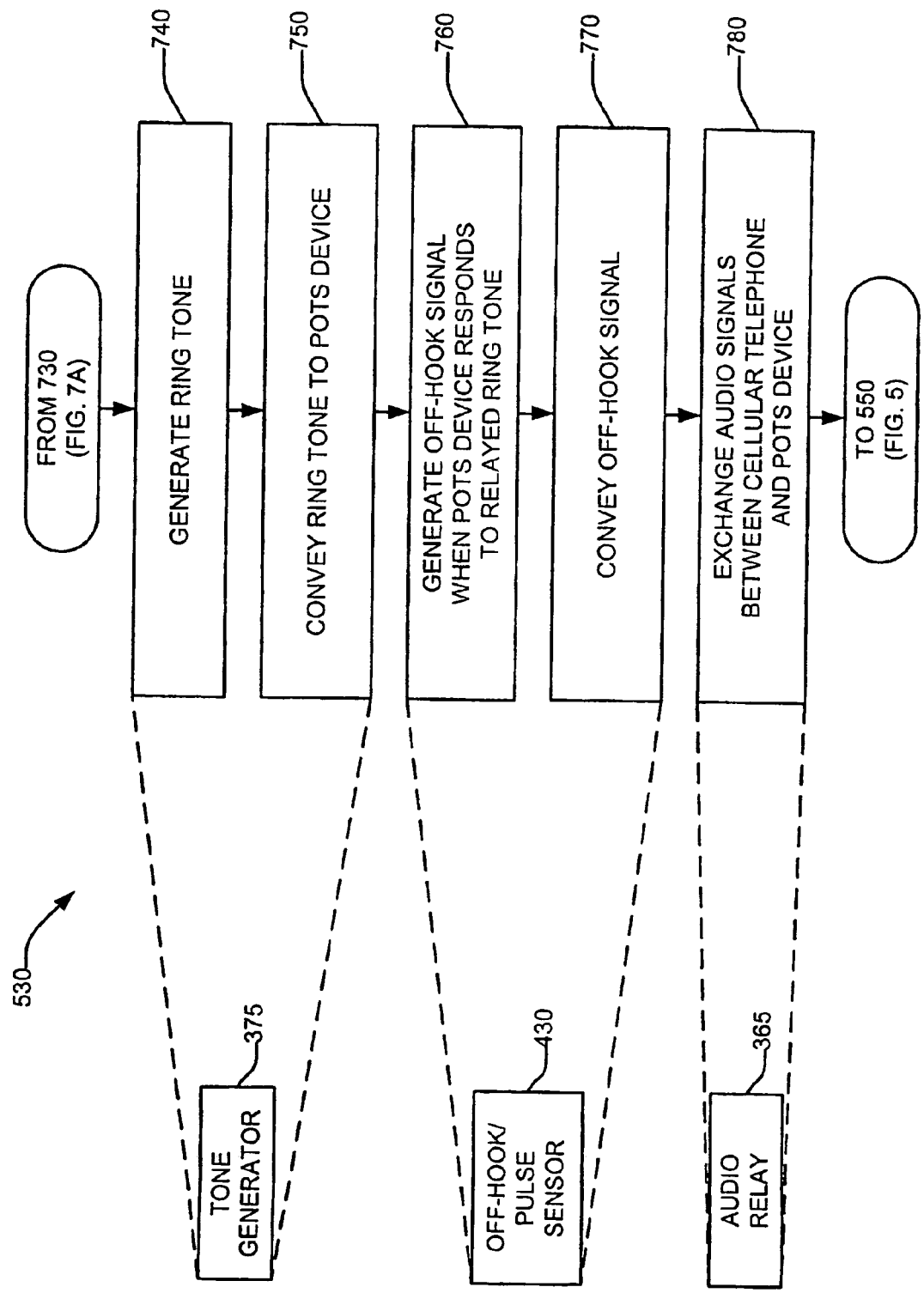

FIGS. 7A and 7B are flowcharts showing another illustrative embodiment of the method associated with the conversion 530 of cellular network compatible signals to POTS compatible signals. Similar to FIGS. 7A and 7B, the cellular network compatible signals here are received through the cellular telephone 305 (FIG. 3). Thus, in step 710, the system receives an incoming call through the cellular telephone 305 (FIG. 3). However, unlike the illustrative embodiment of FIGS. 6A and 6B, once the incoming call is received 710, the system generates, in step 720, signaling data on signaling line 355 (FIG. 3) indicative of the incoming call from the cellular telephone 305 (FIG. 3). The generated 720 signaling data on signaling line 355 (FIG. 3) is then conveyed, in step 730, to an interface controller 370 (FIG. 3). The interface controller 370 (FIG. 3) generates, in step 740, a ring tone in response to signaling data on signaling line 355 (FIG. 3). In a preferred illustrative embodiment, the ring tone is generated 740 by a tone generator 375 (FIG. 3). The generated 740 ring tone is conveyed, in step 750, to the POTS devices 140, 150 (FIG. 2), and, when the POTS device 140, 150 (FIG. 2) is "picked up," an off-hook signal is generated, in step 760, and conveyed, in step 770, to the interface controller 370 (FIG. 3). This triggers the interface controller 370 (FIG. 3) to activate the audio relay 365 (FIG. 3), and analog-audio signals 345 (FIG. 3) are exchanged, in step 780, between the POTS devices 140, 150 (FIG. 2) and the cellular telephone 305 (FIG. 3) through the audio relay 365 (FIG. 3). Thus, in this illustrative embodiment, once the incoming call is connected between the cellular telephone 305 (FIG. 3) and the POTS device 140, 150 (FIG. 2), the POTS device 140, 150 (FIG. 2) freely communicates through the cellular network.

FIG. 8 is a flowchart showing several steps associated with the conversion 540 of POTS compatible signals to cellular network compatible signals. As described above, the interface 240 (FIG. 2) is configured to allow outgoing calls using either pulse-dialing or "tone" dialing. The method steps associated with pulse-dialing are different from the method steps associated with "tone" dialing. However, regardless of which type of dialing is employed, both methods share several of the initial steps. FIG. 8 describes the shared initial steps associated with an outgoing call from a POTS device 140, 150 (FIG. 2) through the cellular network. When a user "picks up" the phone 140 (FIG. 2) to place an outgoing call, the system detects, in step 810, an off-hook signal at the off-hook/pulse detector 430 (FIG. 4). The system then generates, in step 820, a dial tone in response to the detected off-hook signal. In an illustrative embodiment, the dial tone is generated 820 by the tone generator 375 (FIG. 3). The generated 820 dial tone is conveyed, in step 830, to the POTS device 140, 150 (FIG. 2) (i.e., to the person that is placing the outgoing call) to indicate that the system is ready for dialing. In addition to generating 820 the dial tone, the system further generates, in step 840, signaling data on signaling line 355 (FIG. 3) that is indicative of the POTS device 140, 150 (FIG. 2) being off-hook. The generated 840 signaling data on signaling line 355 (FIG. 3) is then conveyed, in step 850, to the cellular telephone 305 (FIG. 3), either with or without modification, through the cellular phone docking station 310 (FIG. 3), thereby indicating to the cellular telephone 305 (FIG. 3) that a user has "picked up" the phone 140 (FIG. 2), and that an outgoing call may be initiated. Thus, in one illustrative embodiment, once the cellular phone 305 (FIG. 3) receives the indication that the user has "picked up" the phone 140 (FIG. 2), the cellular telephone 305 (FIG. 3) blocks incoming calls. Hence, at this point, the system is ready for either pulse dialing or "tone" dialing. In another illustrative embodiment, the step of generating 840 signaling data on signaling line 355 (FIG. 3) may be completely.

Figure 9:
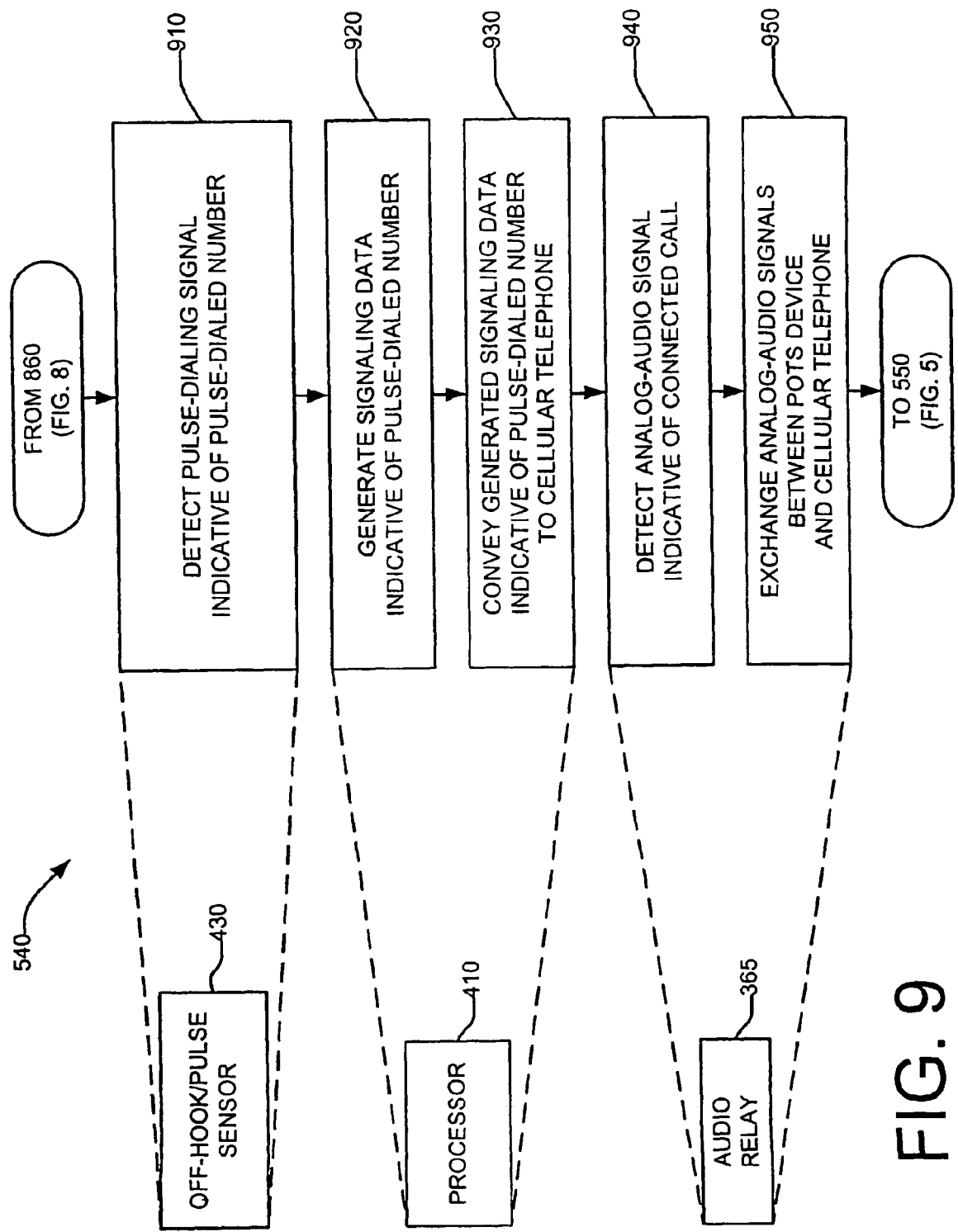
FIGS. 9 through 12 are flowcharts showing several illustrative embodiments of the method associated with the conversion of POTS compatible signals to cellular network compatible signals.
Figure 10:
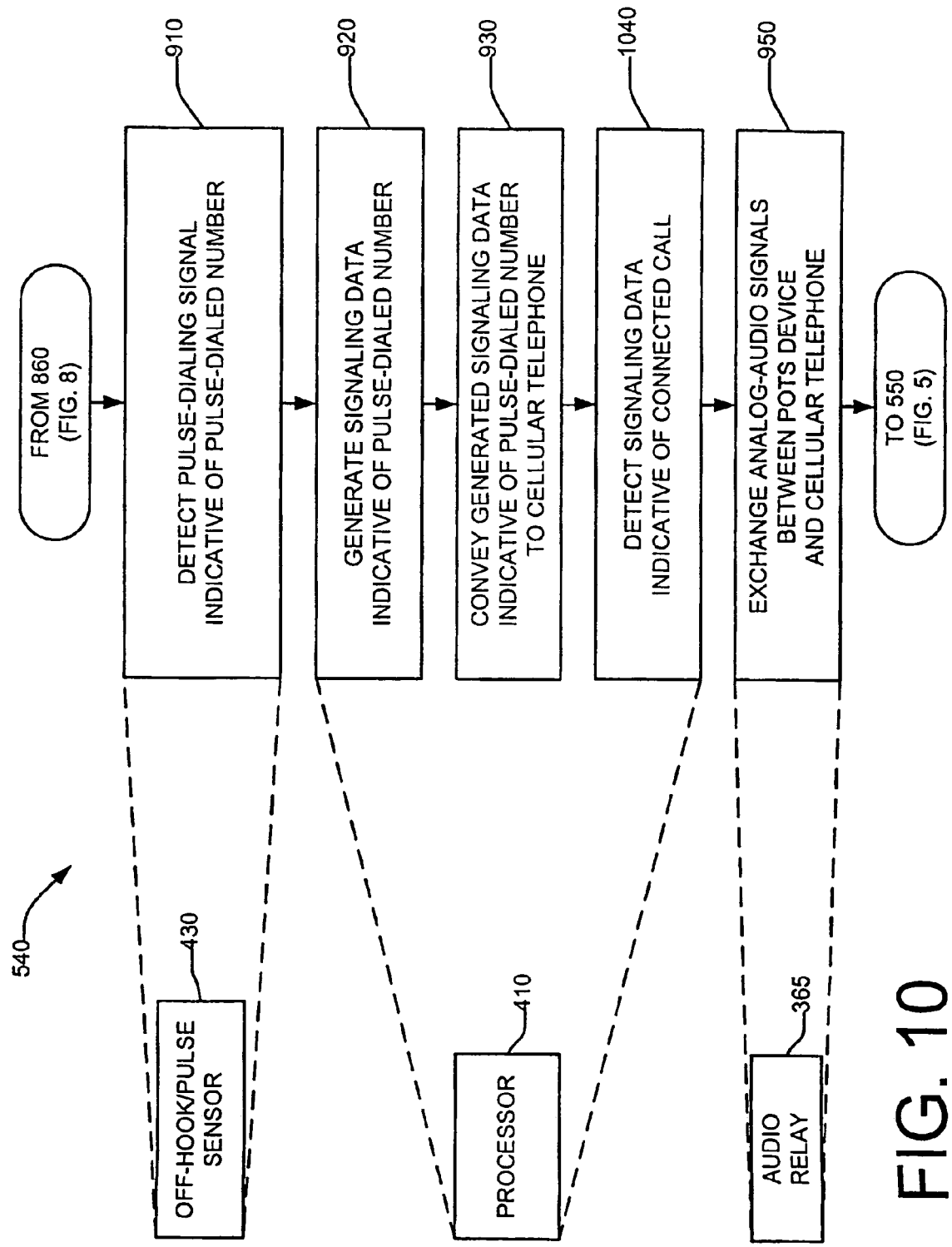

FIGS. 9 and 10 are flowcharts showing several illustrative embodiments of the method associated with pulse dialing. As shown in FIG. 9, in one illustrative embodiment, the off-hook/pulse sensor 430 (FIG. 4) detects, in step 910, a pulse-dialing signal that is indicative of a pulse-dialed number. In response to the pulse-dialing signal, the processor 410 (FIG. 4) generates, in step 920, signaling data on signaling line 355 (FIG. 3) that is indicative of the pulse-dialed number and a "send" command. The signaling data on signaling line 355 (FIG. 3) is conveyed, in step 930, to the cellular telephone 305 (FIG. 3), either with or without modification (e.g., amplification or attenuation), by the processor 410 (FIG. 4) through the cellular phone docking station 310 (FIG. 3).

In one illustrative embodiment, the numbers dialed by the POTS devices 140, 150 (FIG. 2) are stored in RAM 460, and, once a predetermined number of dialed numbers has been stored, the processor 410 (FIG. 4) conveys the stored numbers and a "send" command to the cellular telephone 305 (FIG. 3). In other words, upon receiving enough digits to dial a telephone number, as indicated by the configuration information in SRAM 450 (FIG. 4), the processor 410 (FIG. 4) commands the cellular telephone 305 (FIG. 3) to dial the outgoing number, thereby connecting a call from the POTS device 140, 150 (FIG. 2) through the cellular network. In another illustrative embodiment, the RAM 460 (FIG. 4) stores numbers as they are dialed by the POTS devices 140, 150 (FIG. 2). If, during dialing, the processor 410 (FIG. 4) detects a delay or a pause, then the processor 410 (FIG. 4) presumes that all of the digits of the telephone number have been dialed. Thus, the processor 410 (FIG. 4) commands the cellular telephone 305 to dial the outgoing number, thereby connecting the call from the POTS device 140, 150 (FIG. 2) through the cellular network. The command instructs the cellular telephone 305 (FIG. 3) to call the number that has been conveyed to the cellular telephone 305 (FIG. 3) by the signaling data on signaling line 355 (FIG. 3).

When the called party "picks up" the phone, the system detects, in step 940, an analog-audio signal 345 (FIG. 3) that is indicative of the connected call. At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, once the outgoing call is connected between the cellular telephone 305 (FIG. 3) and the POTS device 140, 150 (FIG. 2), the POTS device 140, 150 (FIG. 2) freely communicates through the cellular network.

In another illustrative embodiment, rather than waiting for the called party to "pick up" the phone, the system detects an analog-audio signal 345 (FIG. 3) that is indicative of a called-party telephone ringing or a called-party telephone being "busy." At this point, the processor 410 (FIG. 4) enables the audio relay 365 (FIG. 3), and analog-audio signals 345 (FIG. 3) are exchanged between the POTS device 140, 150 (FIG. 2) and the cellular telephone 305 (FIG. 3). Thus, once a called-party telephone ringing or a called-party telephone "busy" signal is detected, the cellular telephone 305 (FIG. 3) and the POTS device 140, 150 (FIG. 2) are connected through the cellular network.

FIG. 10 is a flowchart showing, in greater detail, another illustrative embodiment of the method associated with pulse dialing. As shown in FIG. 10, the off-hook/pulse sensor 430 (FIG. 4) detects, in step 910, a pulse-dialing signal that is indicative of a pulse-dialed number. In response to the pulse-dialing signal, the processor 410 (FIG. 4) generates, in step 920, signaling data on signaling line 355 (FIG. 3) that is indicative of the pulse-dialed number. The signaling data on signaling line 355 (FIG. 3) is conveyed, in step 930, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the cellular telephone 305 (FIG. 3) generates signaling data on signaling line 355 (FIG. 3) that is indicative of the connected call, and the processor detects, in step 1040, the signaling data on signaling line 355 (FIG. 3). At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, again, the POTS device 140, 150 (FIG. 2) freely communicates through the cellular network.

In another illustrative embodiment, rather than waiting for the called party to "pick up" the phone, the system detects an analog-audio signal 345 (FIG. 3) that is indicative of a called-party telephone ringing or a called-party telephone being "busy." At this point, the processor 410 (FIG. 4) enables the audio relay 365 (FIG. 3), and analog-audio signals 345 (FIG. 3) are exchanged between the POTS device 140, 150 (FIG. 2) and the cellular telephone 305 (FIG. 3). Thus, once a called-party telephone ringing or a called-party telephone "busy" signal is detected, the cellular telephone 305 (FIG. 3) and the POTS device 140, 150 (FIG. 2) are connected through the cellular network.

Figure 11:
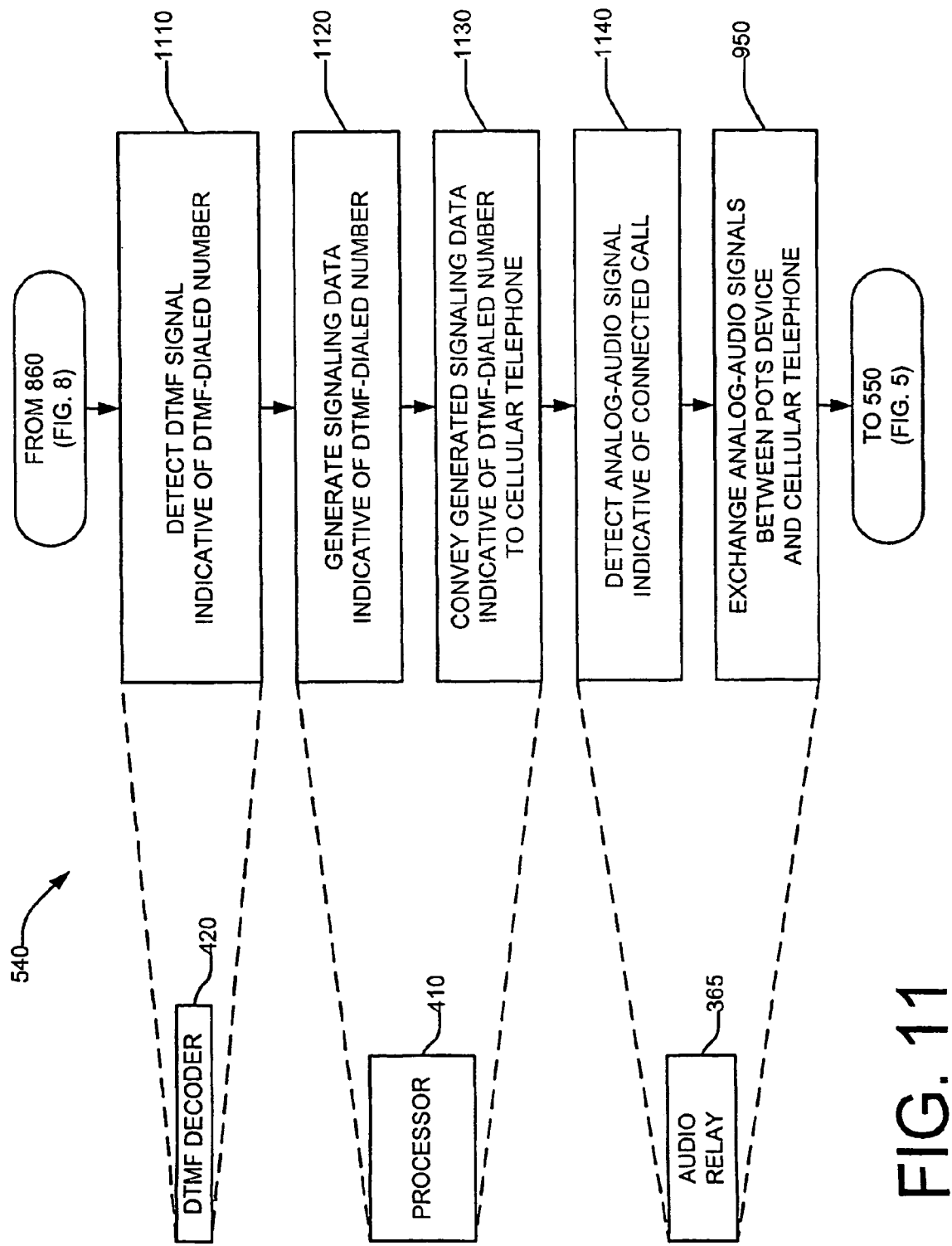
Figure 12:
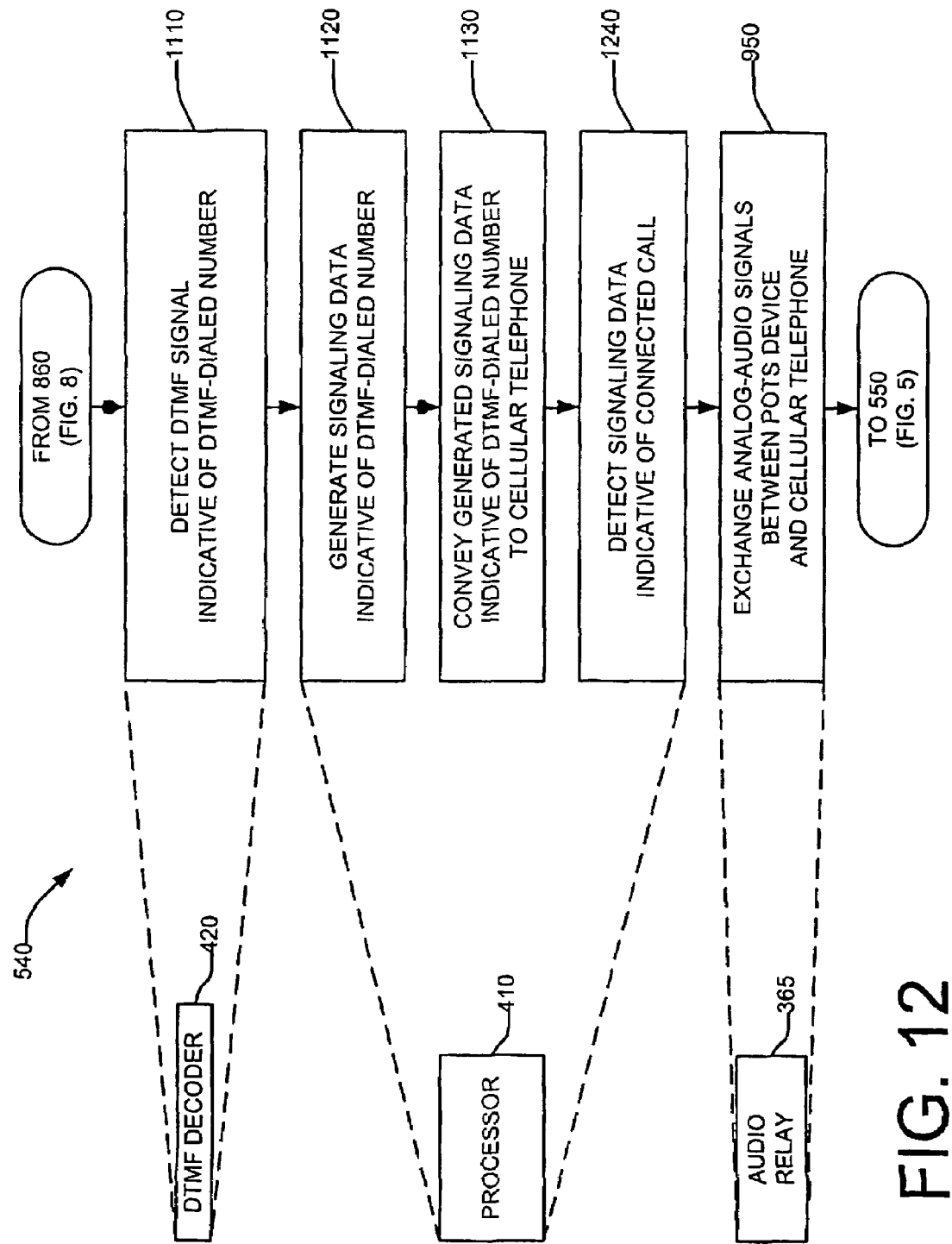

FIGS. 11 and 12 are flowcharts showing several illustrative embodiments of the method associated with "tone" dialing. As shown in FIG. 11, in one illustrative embodiment, the DTMF decoder 420 (FIG. 4) detects, in step 1110, a DTMF signal that is indicative of a DTMF-dialed number. In response to the DTMF signal, the processor 410 (FIG. 4) generates, in step 1120, signaling data on signaling line 355 (FIG. 3) that is indicative of the DTMF-dialed number. The signaling data on signaling line 355 (FIG. 3) is conveyed, in step 1130, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the system detects, in step 1140, an analog-audio signal 345 (FIG. 3) that is indicative of the connected call. At this point, the processor 410 (FIG. 4) enables the audio relay 365 (FIG. 3), and analog-audio signals 345 (FIG. 3) are exchanged, in step 1150, between the POTS device 140, 150 (FIG. 2) and the cellular telephone 305 (FIG. 3). Thus, once the incoming call is connected between the cellular telephone 305 (FIG. 3) and the POTS device 140, 150 (FIG. 2), the POTS device 140, 150 (FIG. 2) freely communicates through the cellular network.

FIG. 12 is a flowchart showing another illustrative embodiment of the method associated with "tone" dialing. As shown in FIG. 12, the DTMF decoder 420 (FIG. 4) detects, in step 1110, a DTMF signal that is indicative of a DTMF-dialed number. In response to the DTMF signal, the processor 410 (FIG. 4) generates, in step 1120, signaling data on signaling line 355 (FIG. 3) that is indicative of the DTMF-dialed number. The signaling data on signaling line 355 (FIG. 3) is conveyed, in step 1130, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the cellular telephone 305 (FIG. 3) generates signaling data on signaling line 355 (FIG. 3) that is indicative of the connected call, and the processor detects, in step 1240, the signaling data on signaling line 355 (FIG. 3). At this point, the processor 410 (FIG. 4) enables the audio relay 365 (FIG. 3), and analog-audio signals 345 (FIG. 3) are exchanged, in step 1150, between the POTS device 140, 150 (FIG. 2) and the cellular telephone 305 (FIG. 3). Thus, again, the POTS device 140, 150 (FIG. 2) freely communicates through the cellular network.

While several hardware components are shown with reference to FIGS. 3 and 4 to describe the interface controller 370, it will be clear to one of ordinary skill in the art that the interface controller 370 may be implemented in hardware, software, firmware, or a combination thereof. In one illustrative embodiment, the interface controller 370 (FIG. 3) is implemented in software or firmware that is stored in a memory and that is executed by a suitable instruction execution system. If implemented in hardware, as in FIGS. 3 and 4, the interface controller may be implemented with any or a combination of the following technologies: a discrete logic circuit having logic gates for implementing logic functions upon data signals, an application specific integrated circuit (ASIC) having appropriate combinational logic gates, a programmable gate array (PGA), a field programmable gate array (FPGA), etc.

Figure 13:
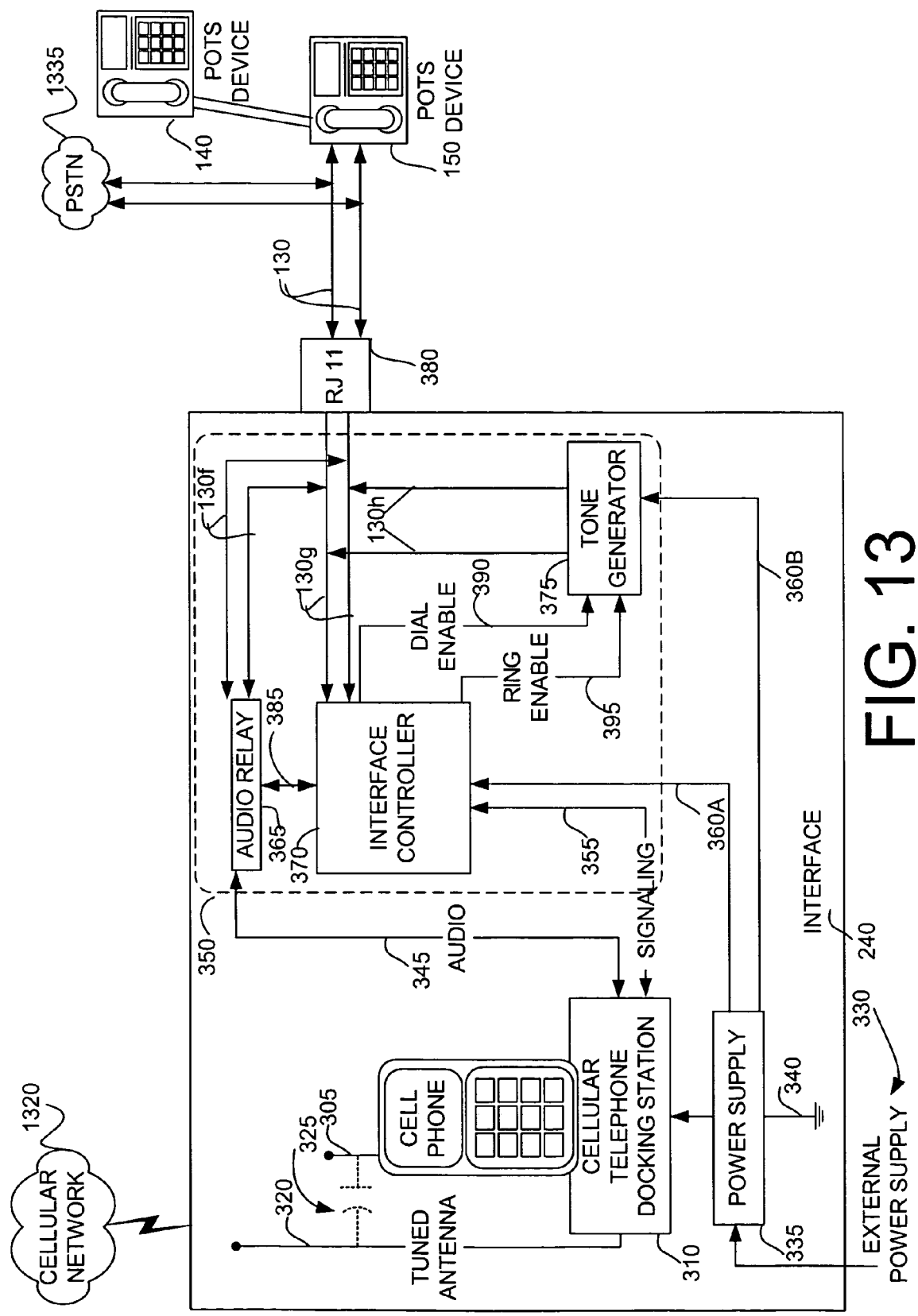
FIG. 13 is a block diagram showing an alternative illustrative embodiment of the interface 240 of FIG. 2.

FIG. 13 is a block diagram showing an alternative illustrative embodiment of the interface 240 of FIG. 3. As described above in the discussion of the illustrative embodiment of FIG. 3, the cellular network compatible signals are transmitted and received at the interface 240 by a cellular telephone 305 while the POTS compatible signals are transmitted and received at the interface 240 through a POTS connector 380, such as an RJ11 connector 380. As described above with respect to FIG. 3, the interface 240 in this illustrative embodiment comprises a cellular phone docking station 310 that is configured to interface with the cellular telephone 305, an interface controller 370, and a tone generator 375.

The cellular phone docking station 310 is configured to receive signaling data through signaling line 355 from the cellular telephone 305. In the presently described illustrative embodiment, the signaling data on the signaling line 355 may include data indicative of an incoming telephone call from cellular network 1320. The signaling data may further include feature data. As defined herein, feature data may include, but is not limited to, caller identification ("caller ID") information and ring tone information. It will be appreciated that the ring tone information may include customized ring tones stored on the cellular telephone 305. For instance, a customized ring tone may be a song which is played whenever an incoming call is received or whenever an incoming call is received from a specified caller.

The received signaling data on the signaling line 355 by the cellular phone docking station 310 is conveyed to the interface controller 370. In conveying the signaling data on the signaling line 355, the cellular phone docking station 305 may modify the signaling data on the signaling line 355 appropriately (e.g., amplify, attenuate, reformat, etc.), or, alternatively, the cellular phone docking station 305 may relay the signaling data on the signaling line 355 without modification. As discussed above in the description of FIG. 3, the tone generator 375 is configured to generate certain tones that are used by the POTS devices 140, 150. A ring tone is generated in response to a ring enable signal on ring enable line 395.

The interface controller 370 is configured to control the behavior of the tone generator 375 and the cellular phone docking station 310 during the conversion of cellular network and cellular telephone compatible signals to POTS compatible signals and vice versa. Thus, in the case of an incoming telephone call, the cellular telephone 305 detects the incoming telephone call and conveys this information to the interface controller 370 (through the cellular telephone docking station 310) through signaling data on the signaling line 355, thereby indicating that there is an incoming call. As discussed above, in this embodiment, the signaling data also includes feature data. The interface controller 370 receives the signaling data and processes the feature data in addition to generating a ring enable signal on ring enable line 395. The ring enable signal on ring enable line 395 is received by the tone generator 375, which generates the ring tone in response to the ring enable signal on ring enable line 395. The tone makes the POTS devices 140, 150 (FIG. 2) "ring." Based on information contained within the feature data, the interface controller 370 may generate an appropriate POTS compatible signal and pass through the feature data to the POTS devices 140, 150 prior to the POTS devices 140, 150 being answered. A flowchart of illustrative steps undertaken by the interface controller 370 in passing through of the feature data to the POTS devices 140, 150 will be discussed in greater detail below in the description of FIGS. 14-19.

Figure 14:
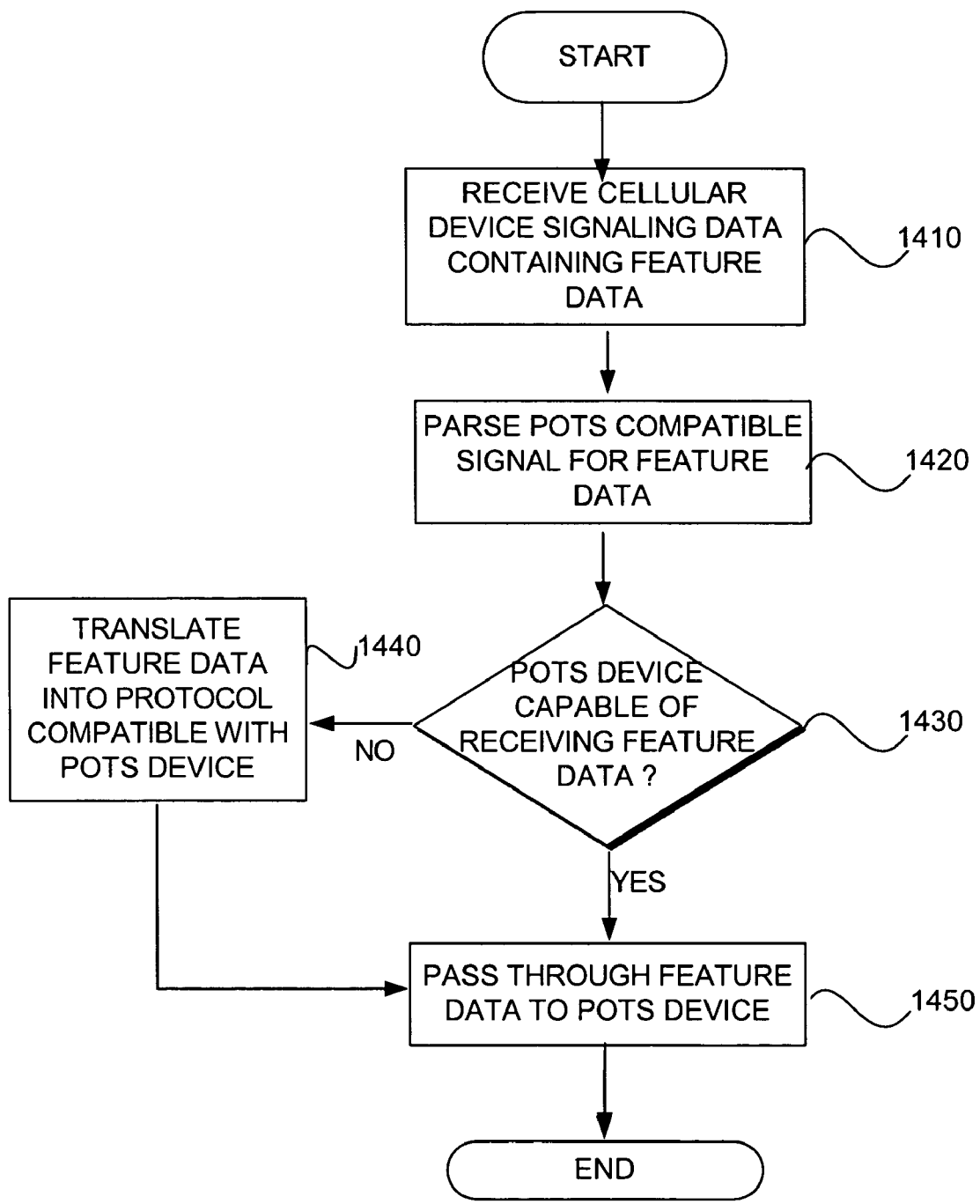
FIG. 14 is a flowchart showing an illustrative embodiment of the method associated with passing through cellular network device feature data to POTS devices.

FIG. 14 is a flowchart showing an illustrative embodiment of a method for passing through cellular network device feature data to POTS devices. As shown in FIG. 14, the interface controller 370 receives, at step 1410, cellular network signaling data which may include feature data, from the cellular telephone docking station 310. In particular, the signaling data on the signaling line 355 (FIG. 13) may be generated in response to an incoming call from the cellular network 1320 to the cellular telephone 305. The signaling data received on the signaling line 355 is parsed, in step 1420, for the feature data by the interface controller 370. In particular, the interface controller 370 may be configured so that the processor 410 (FIG. 4) parses the signaling data for the presence of caller ID or ring tone information.

After parsing the signaling data, the interface controller 370 determines, at step 1430, if the POTS devices 140, 150 are capable of receiving the feature data contained within. In particular, the interface controller 370 may be configured so that the information regarding the POTS devices 140, 150 is stored in memory such as the RAM 460 (FIG. 4). The stored information may indicate, for example, whether either of the POTS devices 140, 150 includes digital components capable of receiving and displaying caller ID information and whether either of the POTS devices 140, 150 is capable of receiving and playing back digital ring tones. The interface controller 370 may further be configured so that the processor 410 (FIG. 4) retrieves the POTS device information from the RAM 460 (FIG. 4) and processes the feature data based on the capabilities of the connected POTS device 140, 150.

For instance, if the feature data includes caller ID information and the interface controller 370 determines, at step 1430, that the POTS device 140 is capable of receiving and displaying caller ID information, the interface controller 370 then passes through, at step 1440, the caller ID information to the POTS device 140. It will be appreciated that ring tone information may also be passed through to capable POTS devices such that a melodic ring tone or song capable of being played by the cellular telephone 305 is played by a capable POTS device connected to the interface controller 370.

If, however, the interface controller 370 determines, at step 1430, that the POTS device 140 is not capable of receiving and displaying caller ID information (e.g., the POTS device 140 is a rotary pulse phone), then the interface controller 370 translates, at step 1450, the feature data into a protocol compatible with the POTS device 140 prior to passing it through to the POTS device 140 at step 1440. In particular, the interface controller 370 may be configured to translate the feature data for a rotary pulse phone or conventional touchtone phone by conveying a ring enable signal on ring enable line 395 to the tone generator 375. The ring enable signal generated by the interface controller 370 may be configured to cause the tone generator 375 to emit a distinctive ring, such as a stutter ring tone, which a user of the POTS device 140 may use to audibly determine the identification of a caller. For instance, the interface controller 370 may cause the tone generator 375 to emit three short rings to indicate to a user that his or her mother is calling. It will be appreciated that in the aforementioned example, the interface controller 370 may configured with a list of telephone numbers and associated ring tone patterns input by a user. The list may be stored as data in the RAM 460 (FIG. 4) of the interface controller 370. For instance, a user may associate two stutter rings with his or her work telephone number and three stutter rings with his or her parents' telephone number. The interface controller 370 may be configured to access the list upon parsing the signaling data for the feature data and determining that a connected POTS device is not capable of receiving the feature data as pass through data.

It will further be appreciated in another illustrative embodiment, the feature data contained within the signaling data received by the interface controller 370 may also include other information such as voicemail information. In this illustrative embodiment, the interface controller 370 may be configured to pass through an audible and/or visual voicemail indicator indicative of a new voicemail being left on the cellular telephone 305 for compatible POTS devices. For incompatible POTS devices, it will be appreciated that the interface controller 370 may be configured to generate a stutter ring tone (as described above) indicative of a new voicemail being left on the cellular telephone 305 in communication with the cellular network 1320.

While illustrative embodiments of the present invention have been shown and described, it will be apparent to those of ordinary skill in the art that a number of changes, modifications, or alterations to the invention as described may be made, none of which depart from the spirit of the present invention. For example, while a cellular telephone 305 (FIG. 13) is used as the bridge between the POTS devices 140, 150 and the cellular network, it will be clear to one of ordinary skill in the art that any cellular device may be used as the bridge, such as a cellular compatible personal digital assistant (PDA), cellular modem, or any other cellular device that is configured to transmit and receive data from a cellular network. These and other such changes, modifications, and alterations should therefore be seen as within the scope of the present invention.

We claim:

1. A system for passing through an alternative network device feature to a plain old telephone system (POTS) device, comprising:
    an interface coupled to an alternative network device in communication with an alternative network, wherein the interface is configured to pass through feature data associated with the alternate network device feature contained within alternative network signaling data generated by the alternative network device to the POTS device; wherein the interface comprises:
        a docking station configured to interface with the alternative network device, wherein the docking station is configured to receive the alternative network device signaling data from the alternative network device and convey the alternative network device signaling data from the alternative network device; and
        an interface controller, wherein the interface controller is configured to: receive the alternative network device signaling data from the docking station; parse the signaling data for the feature data; determine if the POTS device is capable of receiving the feature data contained within the signaling data; if the POTS device is capable of receiving the feature data contained within the signaling data, then pass the feature data through to the POTS device; and if the feature data is not capable of receiving the feature data contained within the POTS device, then translate the feature data into a protocol compatible with the POTS device and then pass the feature data through to the POTS device; and
    a POTS connector configured to couple the POTS device to the interface, wherein by receiving the feature data, the POTS device is capable of providing the alternative network device feature, wherein the interface includes an audio relay configured to receive an audio-control signal and transmit an analog-audio signal between the POTS device and the alternative network device in response to the received audio-control signal, and wherein the system detects an analog-audio signal that is indicative of the alternative network device being in use.

2. The system of claim 1, wherein the interface controller is further configured to convey POTS device signaling data from the POTS device to the docking station.

3. The system of claim 1, wherein the interface controller in determining if the POTS device is capable of receiving the feature data contained within the signaling data, is further configured to determine a signaling protocol capable of being received by the POTS device.

4. The system of claim 1, wherein the alternative network device is a cellular telephone.

5. The system of claim 1, wherein the alternative network device signaling data is indicative of an incoming telephone call.

6. The system of claim 1, wherein the interface controller is further configured to generate a tone-enable signal.

7. The system of claim 6, wherein the interface further comprises a tone generator configured to receive the tone-enable signal from the interface controller and generate a tone in response to the received tone-enable signal.

8. The system of claim 7, wherein the tone-enable signal is a ring-enable signal, and the generated tone is a ring tone.

9. The system of claim 8, wherein the interface controller in passing the feature data through to the POTS device is configured to convey the ring-enable signal to the tone generator to generate the ring tone.

10. The system of claim 9, wherein in the ring tone is a stutter tone.

11. The system of claim 1, wherein the feature data comprises caller identification information.

12. The system of claim 1, wherein the feature data comprises ring tone information.

13. A method for passing through an alternative network device feature to a plain old telephone system (POTS) device, comprising:
    receiving alternative network device signaling data containing feature data associated with the alternative network device feature;
    parsing the signaling data for the feature data;
    passing through an interface the feature data associated with the alternate network device feature contained within alternative network signaling data generated by the alternative network device to the POTS device; wherein the interface comprises:
        a docking station configured to interface with the alternative network device, wherein the docking station is configured to receive the alternative network device signaling data from the alternative network device and convey the alternative network device signaling data from the alternative network device; and
        an interface controller, wherein the interface controller is configured to: receive the alternative network device signaling data from the docking station; parse the signaling data for the feature data; determine if the POTS device is capable of receiving the feature data contained within the signaling data; if the POTS device is capable of receiving the feature data contained within the signaling data, then pass the feature data through to the POTS device; and if the feature data is not capable of receiving the feature data contained within the POTS device, then translate the feature data into a protocol compatible with the POTS device and then pass the feature data through to the POTS device;

determining if the POTS device is capable of receiving the feature data contained within the signaling data, wherein determining if the POTS device is capable of receiving the feature data comprises:

receiving an audio-control signal at the interface, and transmitting an analog-audio signal between the POTS device and the alternative network device in response to the received audio-control signal, wherein the analog-audio signal is indicative of the alternative network device being in use; and if the POTS device is capable of receiving the feature data contained within the signaling data, then passing the feature data through to the POTS device.

14. The method of claim 13 further comprising if the feature data is not capable of receiving the feature data contained within the POTS device, then translating the feature data into a protocol compatible with the POTS device and then passing the feature data through to the POTS device.

15. The method of claim 13, wherein determining if the POTS device is capable of receiving the feature data contained within the signaling data comprises determining a signaling protocol capable of being received by the POTS device.

16. The method of claim 13, wherein passing the feature data through to the POTS device comprises conveying a ring-enable signal to generate a ring tone.

17. The method of claim 16, wherein in the ring tone is a stutter tone.

18. The method of claim 13, wherein the feature data comprises caller identification information.

19. The method of claim 13, wherein the feature data comprises ring tone information.

20. The method of claim 13, wherein the alternative network device is a cellular telephone.

21. A computer-readable medium having computer-executable instructions stored thereon which, when executed by a computer, will cause the computer to perform a method for passing through an alternative network device feature to a plain old telephone system (POTS) device, the method comprising:

receiving alternative network device signaling data containing feature data associated with the alternative network device feature;

parsing the signaling data for the feature data;

passing through an interface the feature data associated with the alternate network device feature contained within alternative network signaling data generated by the alternative network device to the POTS device; wherein the interface comprises:

a docking station configured to interface with the alternative network device, wherein the docking station is configured to receive the alternative network device signaling data from the alternative network device and convey the alternative network device signaling data from the alternative network device; and an interface controller, wherein the interface controller is configured to: receive the alternative network device signaling data from the docking station; parse the signaling data for the feature data; determine if the POTS device is capable of receiving the feature data contained within the signaling data; if the POTS device is capable of receiving the feature data contained within the signaling data, then pass the feature data through to the POTS device; and if the feature data is not capable of receiving the feature data contained within the POTS device, then translate the feature data into a protocol compatible with the POTS device and then pass the feature data through to the POTS device;

determining if the POTS device is capable of receiving the feature data contained within the signaling data, wherein determining if the POTS device is capable of receiving the feature data comprises:

receiving an audio-control signal at the interface, and transmitting an analog-audio signal between the POTS device and the alternative network device in response to the received audio-control signal, wherein the analog-audio signal is indicative of the alternative network device being in use; and if the POTS device is capable of receiving the feature data contained within the signaling data, then passing the feature data through to the POTS device.

22. The computer-readable medium of claim 21 further comprising if the feature data is not capable of receiving the feature data contained within the POTS device, then translating the feature data into a protocol compatible with the POTS device and then passing the feature data through to the POTS device.

23. The computer-readable medium of claim 21, wherein determining if the POTS device is capable of receiving the feature data contained within the signaling data comprises determining a signaling protocol capable of being received by the POTS device.

24. The computer-readable medium of claim 21, wherein passing the feature data through to the POTS device comprises conveying a ring-enable signal to generate a ring tone.

25. The computer-readable medium of claim 24, wherein in the ring tone is a stutter tone.

26. The computer-readable medium of claim 21, wherein the feature data comprises caller identification information.

27. The computer-readable medium of claim 21, wherein the feature data comprises ring tone information.

28. The computer-readable medium of claim 21, wherein the alternative network device is a cellular telephone.

* * * * *